(12) United States Patent
Barnes et al.

(10) Patent No.: US 9,837,852 B1
(45) Date of Patent: Dec. 5, 2017

(54) HARNESSING FRONT LIGHT IN E-READERS TO GENERATE ELECTRICITY

(71) Applicant: Amazon Technologies, Inc., Seattle, WA (US)

(72) Inventors: Christopher Dwight Barnes, Mountain View, CA (US); Mohammed Aftab Alam, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 461 days.

(21) Appl. No.: 14/577,160

(22) Filed: Dec. 19, 2014

(51) Int. Cl.
| | | |
|---|---|---|
| *H02J 7/35* | (2006.01) | |
| *F21V 8/00* | (2006.01) | |
| *F21V 7/22* | (2006.01) | |
| *H02S 40/22* | (2014.01) | |

(52) U.S. Cl.
CPC .............. *H02J 7/35* (2013.01); *F21V 7/22* (2013.01); *G02B 6/0043* (2013.01); *G02B 6/0073* (2013.01); *H02S 40/22* (2014.12)

(58) Field of Classification Search
CPC ....................................................... H02S 40/22
USPC ................. 307/154; 250/200, 227.14, 239
See application file for complete search history.

(56) References Cited

U.S. PATENT DOCUMENTS

| | | | |
|---|---|---|---|
| 2,524,811 A | 10/1950 | Koberlein | |
| 4,139,342 A | 2/1979 | Sheldrake et al. | |
| 5,040,098 A * | 8/1991 | Tanaka | G02B 6/002 362/23.15 |
| 6,744,960 B2 * | 6/2004 | Pelka | B82Y 10/00 362/259 |
| 9,263,605 B1 * | 2/2016 | Morgan | H01L 31/0547 |
| 2007/0295383 A1 * | 12/2007 | Li | C09K 11/7734 136/246 |
| 2010/0180946 A1 * | 7/2010 | Gruhlke | H01L 31/0547 136/259 |
| 2012/0031466 A1 * | 2/2012 | Bruer | H01L 31/055 136/246 |
| 2013/0215122 A1 * | 8/2013 | McCollum | G02B 6/0018 345/501 |

OTHER PUBLICATIONS

Bordihn et al. Large Area N-Type CZ Double Side Contacted Back-Junction Boron Emitter Solar Cell. 26th European Photovoltaic Solar Energy Conference and Exhibition. 2011.
Brus. Electronic Wave Functions in Semiconductor Clusters: Experiment and Theory. The Journal of Physical Chemistry. vol. 90, No. 12, pp. 2555-2560, 1986.

(Continued)

*Primary Examiner* — Adi Amrany
(74) *Attorney, Agent, or Firm* — Pierce Atwood LLP

(57) ABSTRACT

An electronic device with a e-paper display that internally integrates photovoltaic cells and are not apparent from the exterior of the device. A light source of the device injects light into a light guide to front-light the e-paper. Light that leaks from edges of the light guide is captured by the photovoltaic cells. The plastic light guide is also impregnated with a photoluminescent material that absorbs near infrared energy that is incident on a face of the display and re-emits it isotropically to be guided by the light guide to the photovoltaic cells. By combining multiple techniques to illuminate hidden photovoltaic cells, the utility of the hidden cells is maximized.

20 Claims, 18 Drawing Sheets

(56) References Cited

OTHER PUBLICATIONS

Ekimov, et al. Quantum Size Effect in Semiconductor Microcrystals. Solid State Communications. vol. 56, No. 11, pp. 921-924, 1985.
Oster, et al. Luminescence in Plastics. Nature Publishing Group. Nature. vol. 196, pp. 1089-1090, 1962.

* cited by examiner

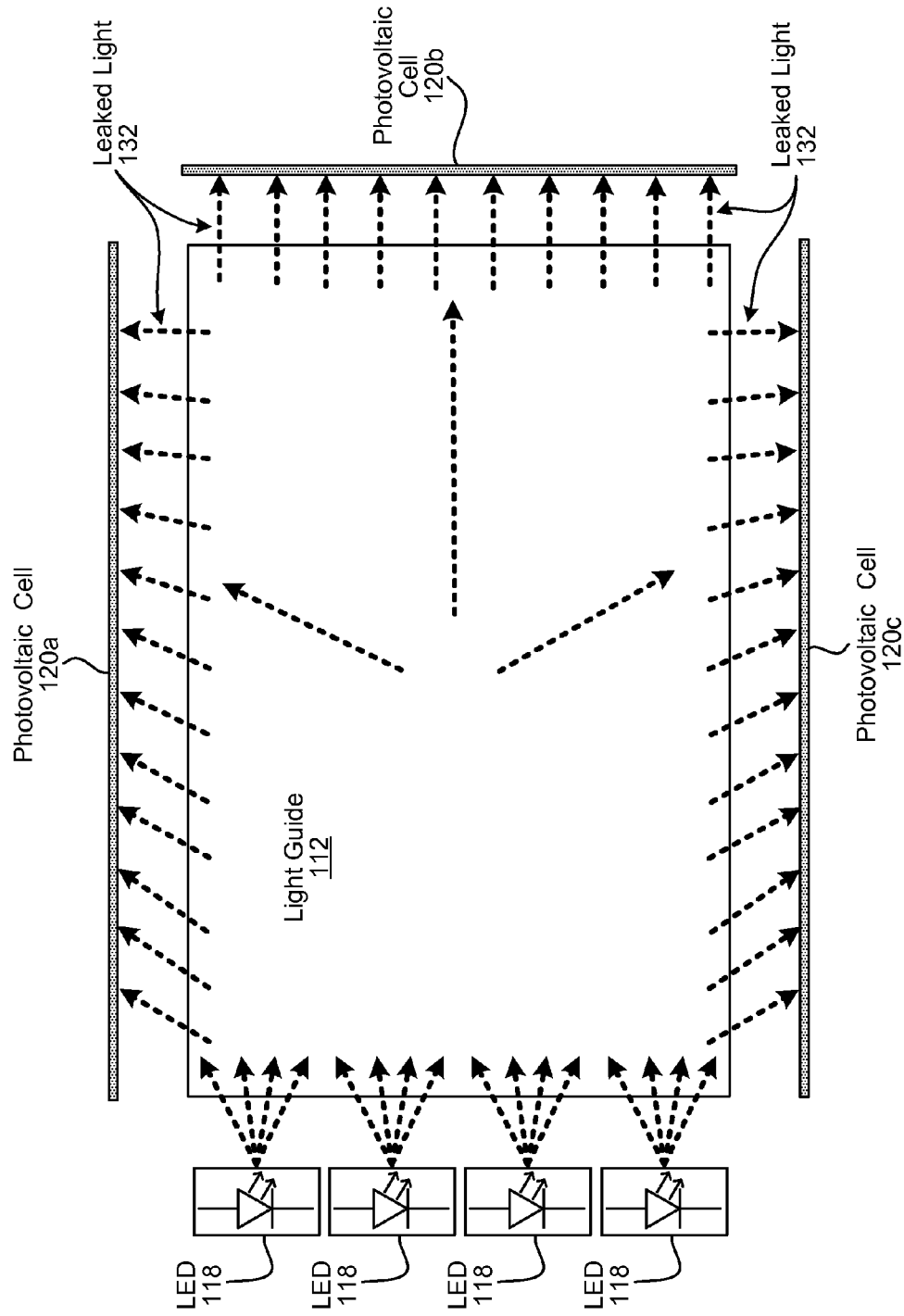

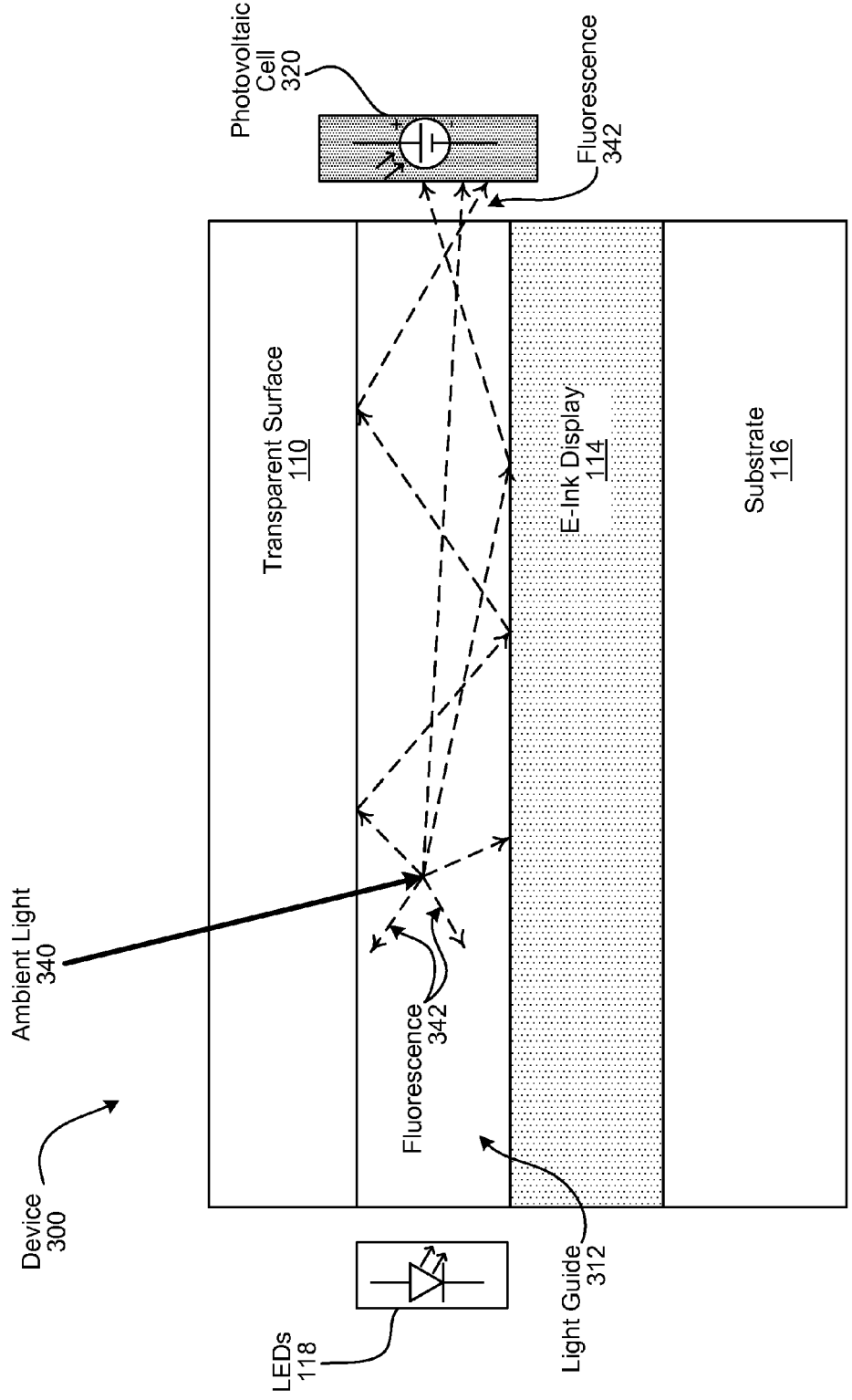

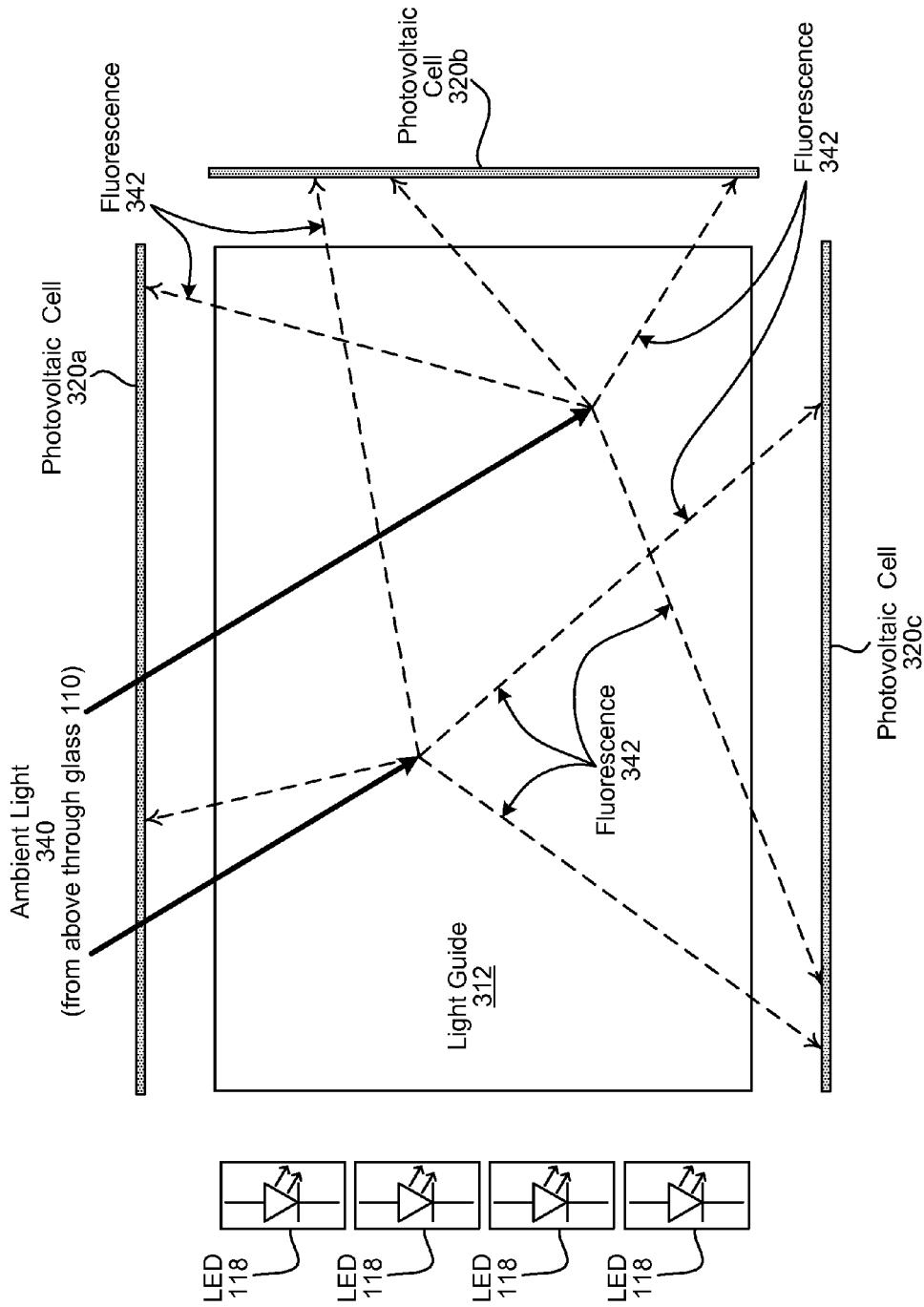

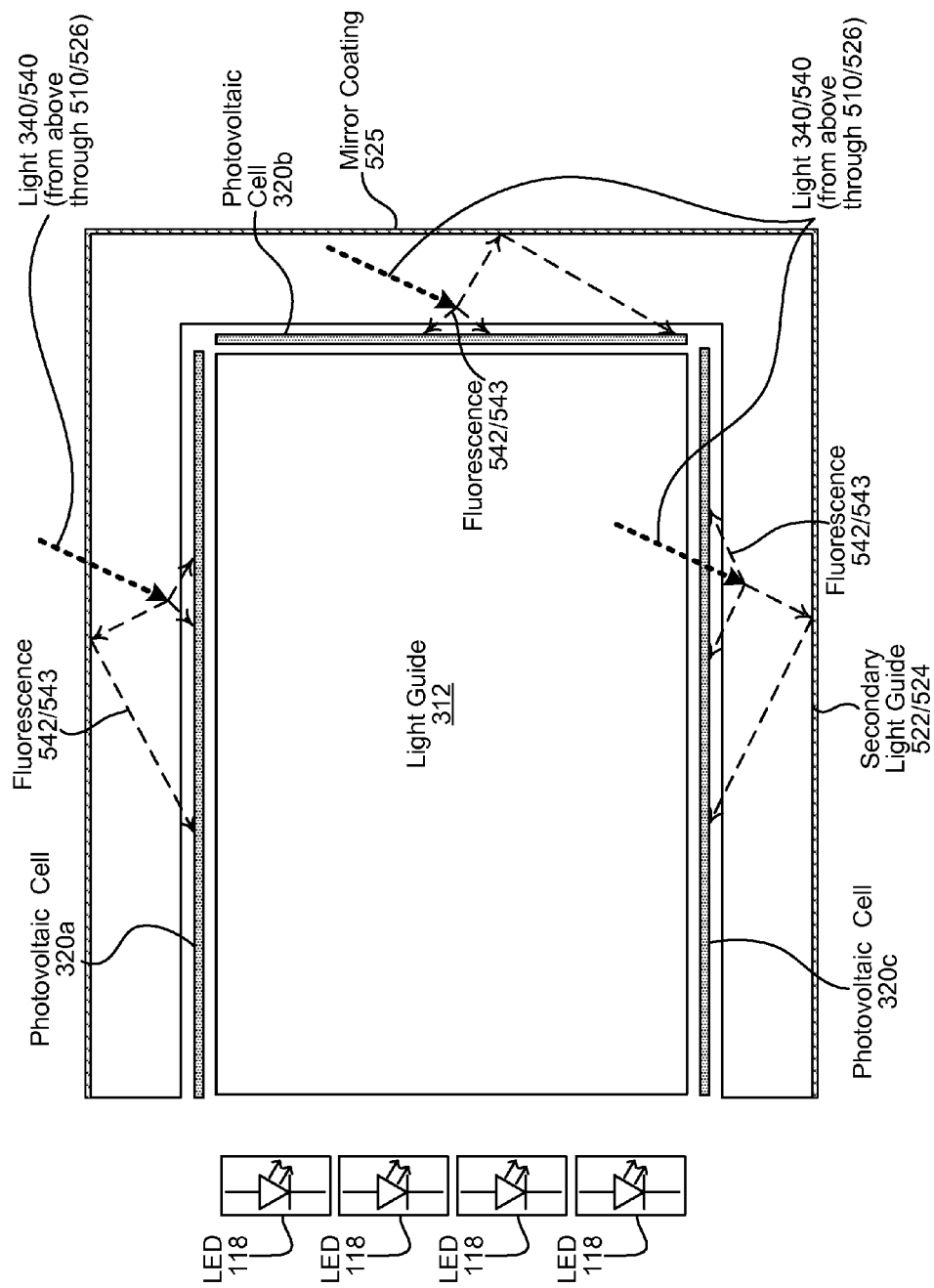

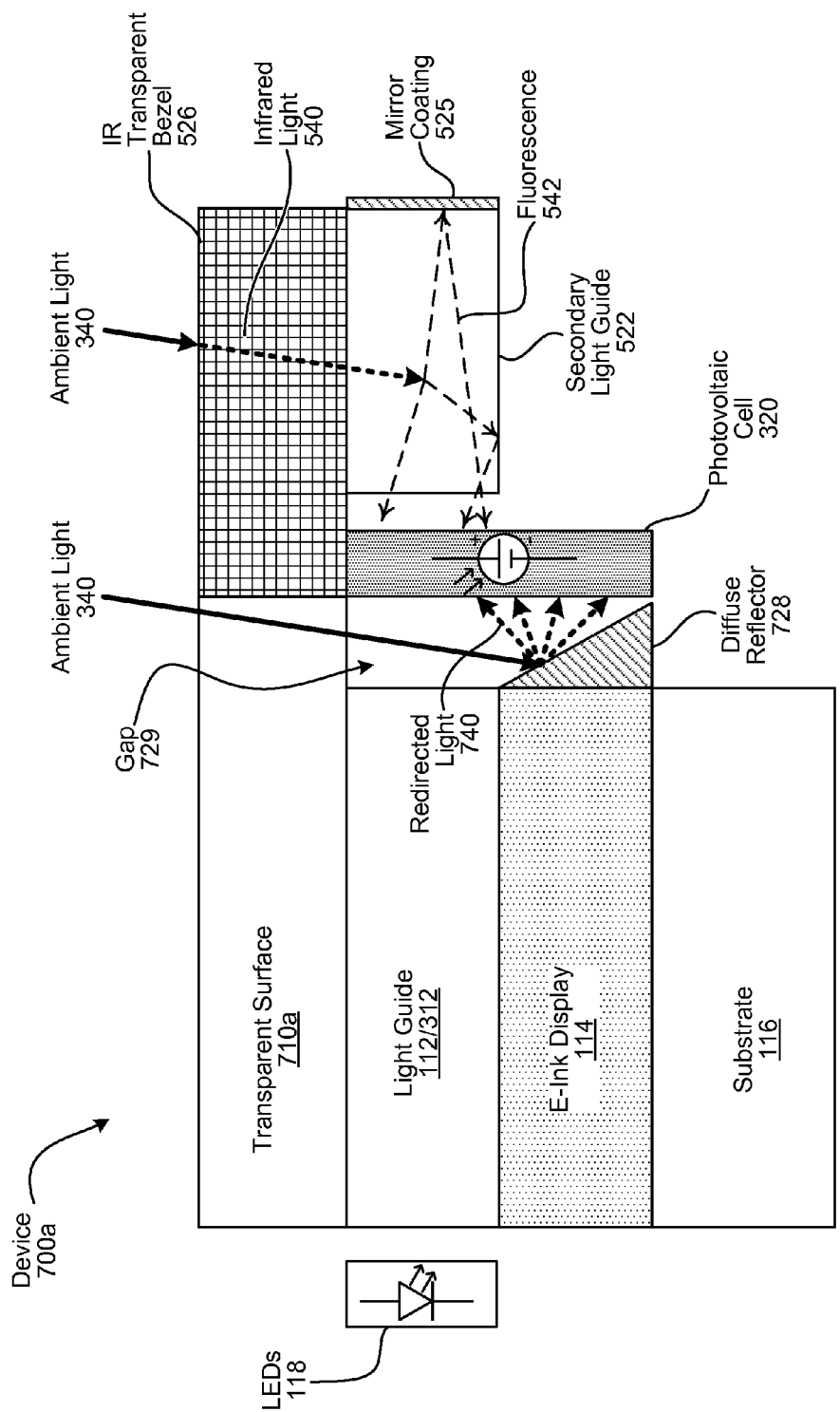

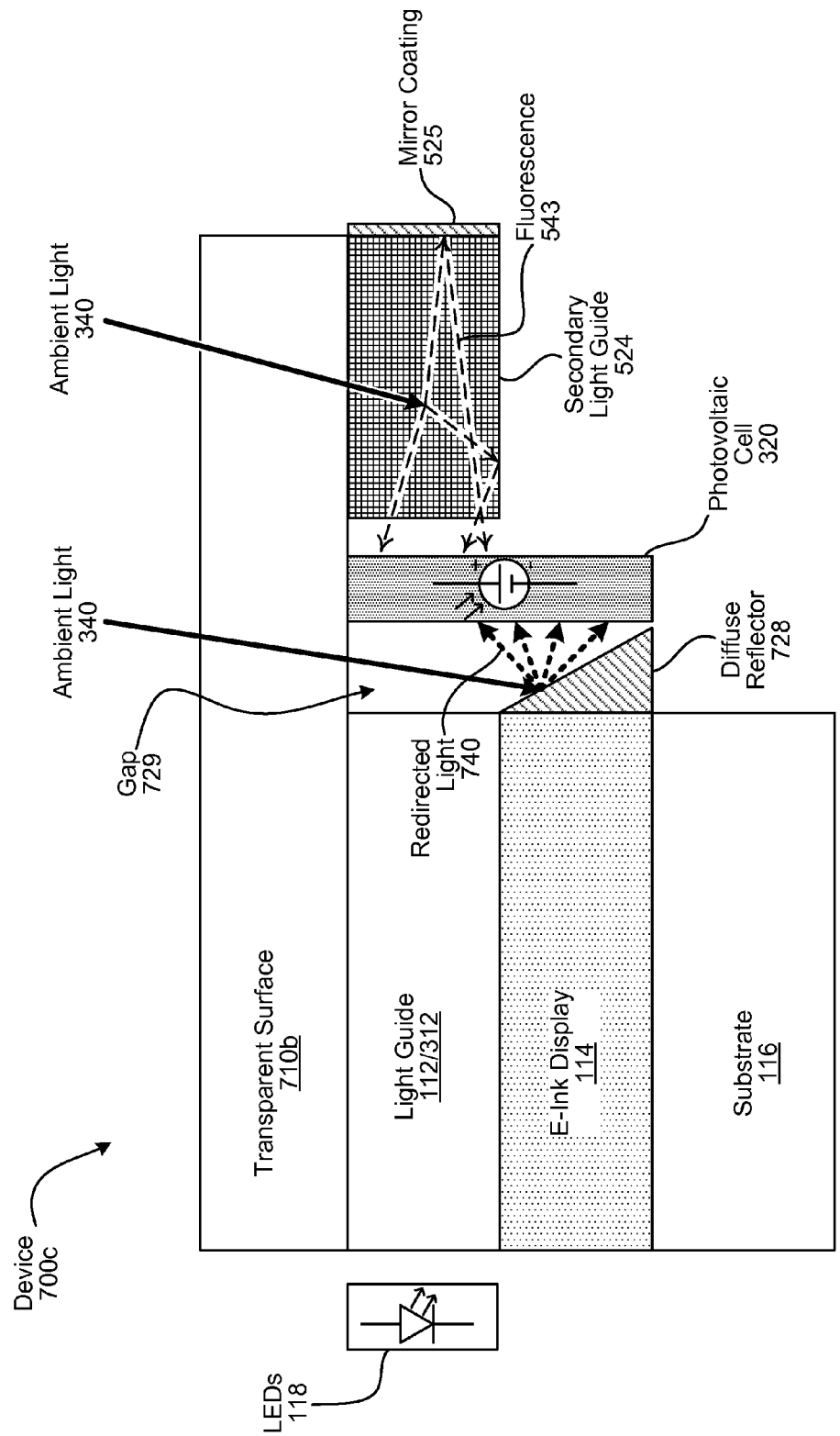

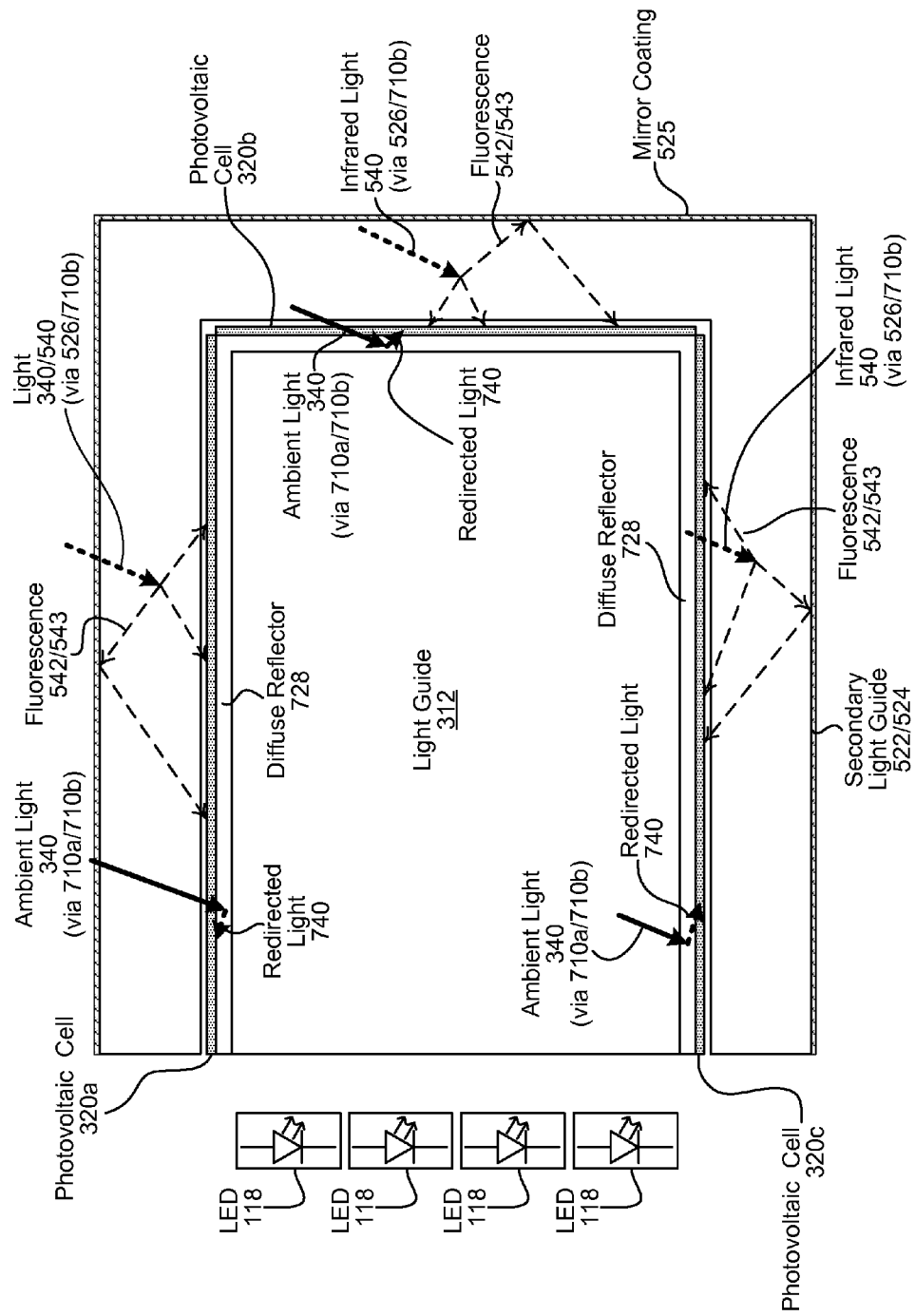

HARNESSING FRONT LIGHT IN E-READERS TO GENERATE ELECTRICITY

BACKGROUND

"Solar power" photovoltaic cells have been used to charge and power various consumer electronic devices since the introduction of the solar-powered handheld calculators in the late 1970s. A portion of the face of such devices was dedicated to the photovoltaic cells. However, in today's mobile phones and tablet computers, surface area is at a premium, leaving no space on the front of the device to dedicate in any meaningful way to photovoltaic cells. As a result, solar chargers for phones and tables are offered as external add-ons to be connected by cable or mounted on the back of the device, reducing the utility and convenience of charging the device using ambient light.

BRIEF DESCRIPTION OF DRAWINGS

For a more complete understanding of the present disclosure, reference is now made to the following description taken in conjunction with the accompanying drawings.

FIG. 2 illustrates a top-down conceptual view of a cross-section across the light guide layer in the first device.

FIG. 3 illustrates a side cross-sectional conceptual view of a display of a second device where ambient light incident on the device and stray light from the light guide are converted into photovoltaic power.

FIG. 4 illustrates a top-down conceptual view across a cross-section of the light guide layer in the second device.

FIG. 6 illustrates a top-down view of a cross-section across the light guide layer in a device including the bezel structures.

FIGS. 7A to 7C illustrate a diffuse reflector that may be added around the periphery of the display to capture additional ambient light.

FIG. 8 illustrates a top-down conceptual view of a cross-section across the light guide layer including the diffuse reflector.

Unless stated otherwise, the figures are not drawn to scale and the relative sizes of features are not proportional.

DETAILED DESCRIPTION

Disclosed are electronic devices internally integrating photovoltaic cells around a periphery of an electronic device's front-lit reflective display screen. The orientation of the photoactive surface or surfaces of the photovoltaic cells is perpendicular to the display. Both ambient light incident on the display and stray edge-lighting leaking from the display's light guide may be used to charge the device's batteries. In general, the internal photovoltaic cells themselves are not visible from the point-of-view of a user of the device. As will be described further below, the use of photovoltaics is particularly well-suited to front-lit reflective electronic displays, where the layer illuminating the display is front of the reflective display layers (e.g., a display layer and a reflective substrate).

Common examples of reflective displays include the monochrome liquid crystal display (LCD) wristwatches and electronic paper (e-paper) display commonly used with e-readers. With sufficient ambient lighting on a face of the display, such display technologies require no additional lighting in order to be read. Reflective electronic displays may be front-lit or back-lit to supplement ambient lighting. In comparison, transmissive display technologies such as the color LCD commonly used with smart telephones and televisions require backlighting in order to be readable.

Figure 1:
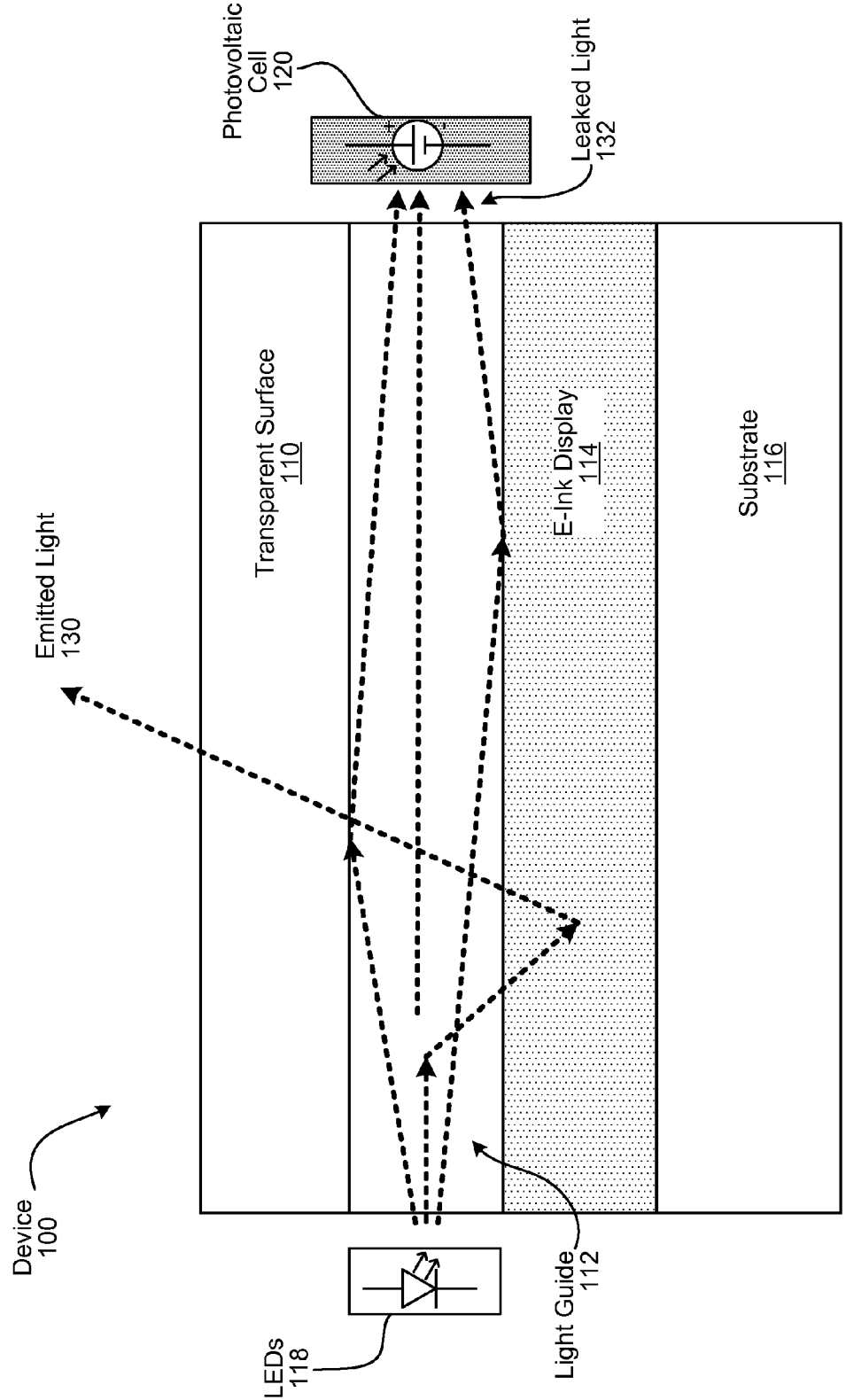
FIG. 1 illustrates a side cross-section conceptual view of a display of a first device where stray light from a light guide is recovered as photovoltaic power.

FIG. 1 illustrates a side cross-sectional conceptual view of a front-lit display of a first device 100 where stray light 132 from a light guide 112 is recovered as photovoltaic power. FIG. 2 illustrates a top-down (overhead) conceptual view of a cross-section of the light guide layer 112 in the first device 100. Conventional structures of the display that are unnecessary to explaining operation of the photovoltaic cells are omitted from the illustrations for brevity, such as the transparent conductors (e.g., indium tin oxide) between a surface transparent layer 110 (e.g., clear glass or clear plastic) and the light guide 112 that may be used to capacitively detect a user's touch. A reflective substrate 116 is illustrated beneath the electronic display layer 114 (e.g., electronic ink), and any substrate material may be used (e.g., glass, plastic, etc.). The LEDs 118 serve as a light source, injecting light into the light to illuminate the reflective electronic display layers (114, 116). Ambient light entering the device through the transparent surface layer 110 and light from the LEDs 118 that is not reflected by the electronic display layer 114 as emitted light 130 may instead be reflected by the substrate 116. The layer 110 of clear material also serves a protective cover for an underlying light guide layer and the reflective electronic display layers.

To simplify explanation, e-ink will be used as an example of the electronic display layer 114. However, as further discussed below, the electronic display layer 114 is not so limited, and other technologies used for reflective displays may be instead be used.

While most light used to illuminate a front-lit the reflective electronic display is reflected off of the e-ink layer (114) or substrate 116 to be emitted (130) through the transparent surface layer 110 of the touchscreen, 10% or more of the light from the light emitting diodes (LEDs) 118 that is distributed across the display by the light guide 112 is lost at the edges of the light guide as stray light 132. In some cases, as much as one-third of injected light may be lost as stray light.

In existing displays, the edges of the light guide may be coated with a black material to absorb stray light, which is wasteful. Mirroring these edges in an effort improve efficiency by redirecting stray light back into the light guide is impractical, as the thin, uneven nature of most plastic light guides results in low-quality mirror coatings. Also, mirroring the edges may result in color shifts in the emitted light, as different wavelengths separate due to the increased distance and the refractive properties of the guide. These issues are more easily addressed in rear-lit displays, where thicker light guides may be used, such that higher quality edge mirroring becomes practical and more of the stray light may be efficiently redirected.

As illustrated in FIGS. 1 and 2, light injected into the light guide 112 along one edge is captured by photovoltaic cells 120a, 120b, and 120c arranged around the periphery of the light guide 112, perpendicular to a face of the display. Even though only part of leaked light 132 can be recovered as photovoltaic power (due to inherent inefficiencies in the photovoltaic cells and losses involved in processing the recovered energy to charge the device's battery), it may add a few percent to the device's battery life. As will be described further below, the material/type of the photovoltaic cells may be selected to increase efficiency based on the cells' absorption characteristics for the color spectrum emitted by the LEDs 118.

The photovoltaic cells 120 are based on conventional solar cells, and may be on the order of 0.1 to 0.2 mm thick (in the light-absorbing direction parallel to the plane formed by the face of the display). Light is converted into electricity within the body of the cell, such that at least about 0.1 mm in thickness is required for efficient operation. Light guides 112 used for front-lighting are typically on the order of 0.5 mm thick, such that a height (perpendicular to a face of the display) of the photovoltaic cell 120 may be (for example) between 0.5 mm and 1 mm. The length of the light guide 112 may be commensurate with the respective length of the edge of the adjacent light guide 112.

Depending upon light guide design considerations (e.g., the size of the display), LEDs may be arranged on more than one edge of the light guide 112. Additionally, photovoltaic cells 120 and LEDs 118 may be interspersed along a same edge of the light guide.

A small air gap may be left between the light guide 112 and the photovoltaic cells 120, or an optically clear adhesive (OCA) such as silicone may be applied to adhere and optically couple the photovoltaic to the guide. Although not necessary, OCA may be used with any of the light guide structures disclosed herein, and is selected based on the refractive index of the light guide (e.g., index matching) and to maximize light transfer (based on the wavelengths to be absorbed by the photovoltaic cells).

FIG. 3 illustrates a side cross-sectional conceptual view of a display of a second device where ambient light incident on the device and stray light from the light guide are converted into photovoltaic power. FIG. 4 illustrates a top-down (overhead) conceptual view across a cross-section of the light guide layer in the second device. Conventional structures unnecessary to explaining operation are again omitted for brevity.

Ideally, it would be beneficial to convert light incident on the display into photovoltaic power. However, an ordinary light guide will redirect very little incident light toward the edges of the light guide. A relevant technology for redirecting incident light toward the edges of a layer is a "luminescent solar concentrator." Such concentrators use a sheet of luminescent material to absorb incident light, and then re-emit the absorbed energy as light having a longer wavelength (than the incident light). Around 75 to 80% of the re-emitted light is trapped in between a front and back of the luminescent sheet due to an optical phenomenon known as total internal reflection, with the re-emitted light reflecting back and forth between the front and back of the sheet until it is emitted at an edge (to be collected by a solar cell).

In practice, however, placing a conventional luminescent solar concentrator plate in front of (or behind) an e-ink layer 114 results in a darkening of the display, as visible incident light is absorbed and converted into electricity instead of being reflected off the e-ink layer 114.

The device 300 addresses this shortcoming by impregnating the light guide 312 with a photoluminescent (i.e., fluorescent or phosphorescent) dyes that absorbs light in the near-infrared spectrum (and optionally, some of the visible red spectrum) and reemits the energy at longer infrared and/or near infrared wavelengths. A dye may also be impregnated into the light guide 312 to absorb ultraviolet wavelengths into infrared and/or near-infrared light. In comparison, the light guide 312 is transparent to visible light (or may have a slightly blue tint if the dyes absorb into visible red), such that the light guide 312 does not visibly darken the display.

As illustrated in FIGS. 3 and 4, the impregnated dyes fluoresce (342) after absorbing incident ambient light 340, with the emitted longer wavelength being converted into electrical current by the edge photovoltaic cells 320, arranged around the display in the same manner as discussed with FIGS. 1 and 2. The re-emitted light 342 is re-emitted isotropically and is guided to the edge for collection by total internal reflection due to differences in refractive indexes between the touch glass 110, light guide layer 312, and e-ink display 114.

The "ultraviolet spectrum" or "ultraviolet light" refers to the portion of the electromagnetic spectrum with a wavelength shorter than that of visible light, but longer than X-rays, that is, in the range between four hundred nanometers and one hundred nanometers. It is so-named because the spectrum consists of electromagnetic waves with frequencies higher than those that humans identify as the color violet.

The "visible spectrum" or "visible light" refers to the portion of the electromagnetic spectrum that is visible to the human eye. A typical human eye will respond to wavelengths from about three-hundred ninety to seven hundred nanometers, which in terms of frequency, corresponds to a band in the vicinity of four hundred thirty to seven hundred ninety terahertz.

"Infrared," the "infrared spectrum," or "infrared light" refers to the portion of the electromagnetic spectrum that extends from about seven hundred nanometers to one millimeter. This range of wavelengths corresponds to a frequency range of approximately four hundred thirty terahertz to three hundred gigahertz. Most of the thermal radiation emitted by objects near room temperature is infrared. A subset of the infrared spectrum adjacent to the visible spectrum is commonly referred to as "near-infrared" (NIR). Boundaries of what constitutes the "near-infrared" subdivision of infrared vary, with a typical definition being seven hundred to fourteen hundred nanometers.

As described further below, the photovoltaic cells 320 may be selected to maximize absorption of the infrared/near-infrared wavelengths emitted by the impregnated dyes. In addition, the photovoltaic cells 320 may be selected to absorb leaked light 132 in the wavelengths emitted by the LEDs 118, such that the device 300 generates power from both leaked front-lighting (as discussed with FIGS. 1 and 2) and from incident light.

Unlike the first device in FIGS. 1 and 2, the second device in FIGS. 3 and 4 can charge the battery even when the front light is off. This is particularly advantageous when the device 300 is used for reading in bright light such as sunlight. Ordinarily, the front light will shut off when bright ambient light is detected (e.g., sunlight), since reflected light will provide a user sufficient contrast for reading, thereby conversing battery power. In the case of device 300, not only is power being conserved by reducing (or turning off) the front lighting when media is read in bright light, but wavelengths of the ambient light are used to charge the device. In comparison, if solar cells were merely mounted on the back of a device, this benefit would be lost is the device were resting on an opaque surface (e.g., a table), since a user would have to choose between charging the device or using the device.

Figure 5A:
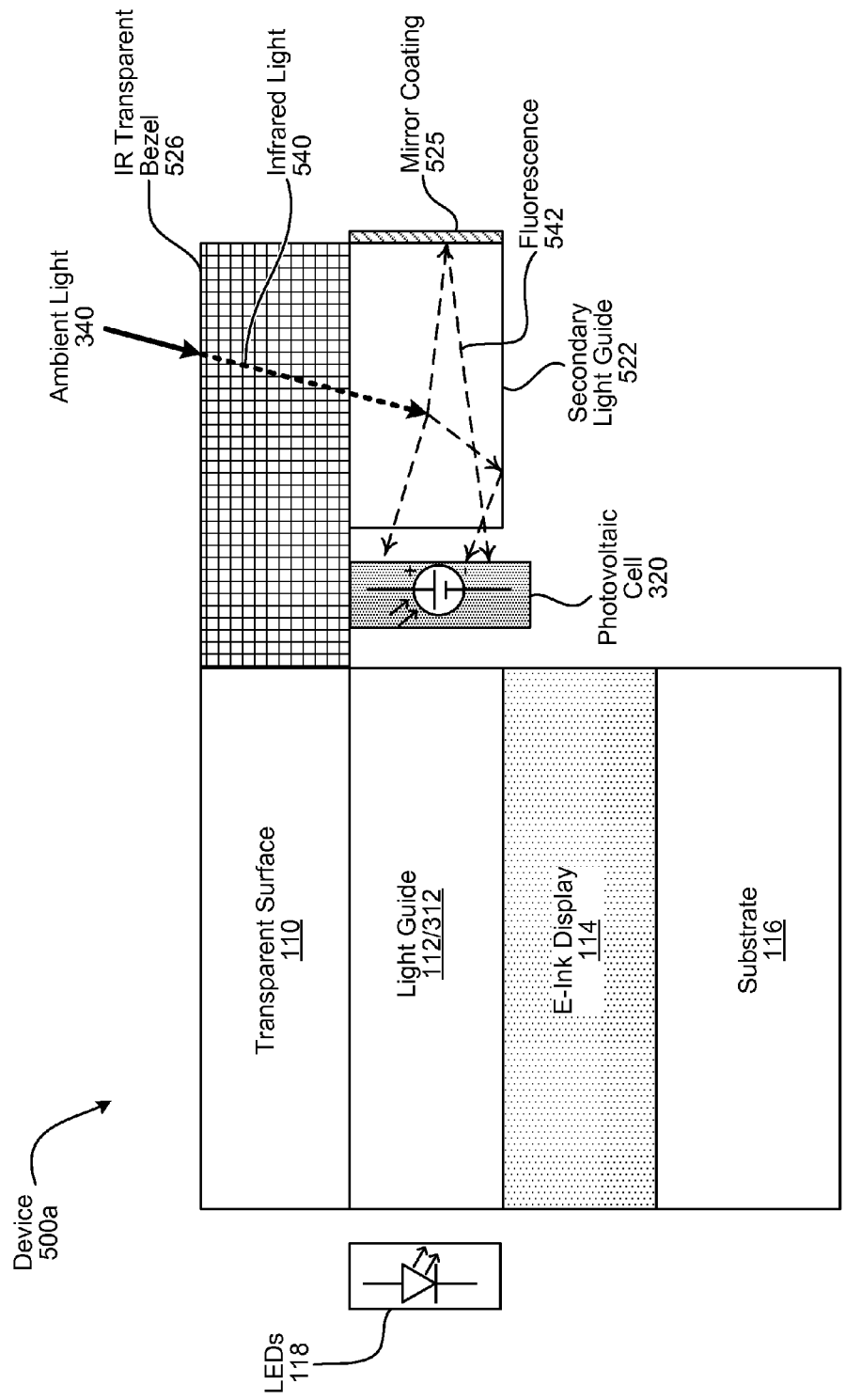
FIGS. 5A to 5C illustrate conceptual features of bezel structures including secondary light guides for capturing infrared light through a bezel.
Figure 5B:
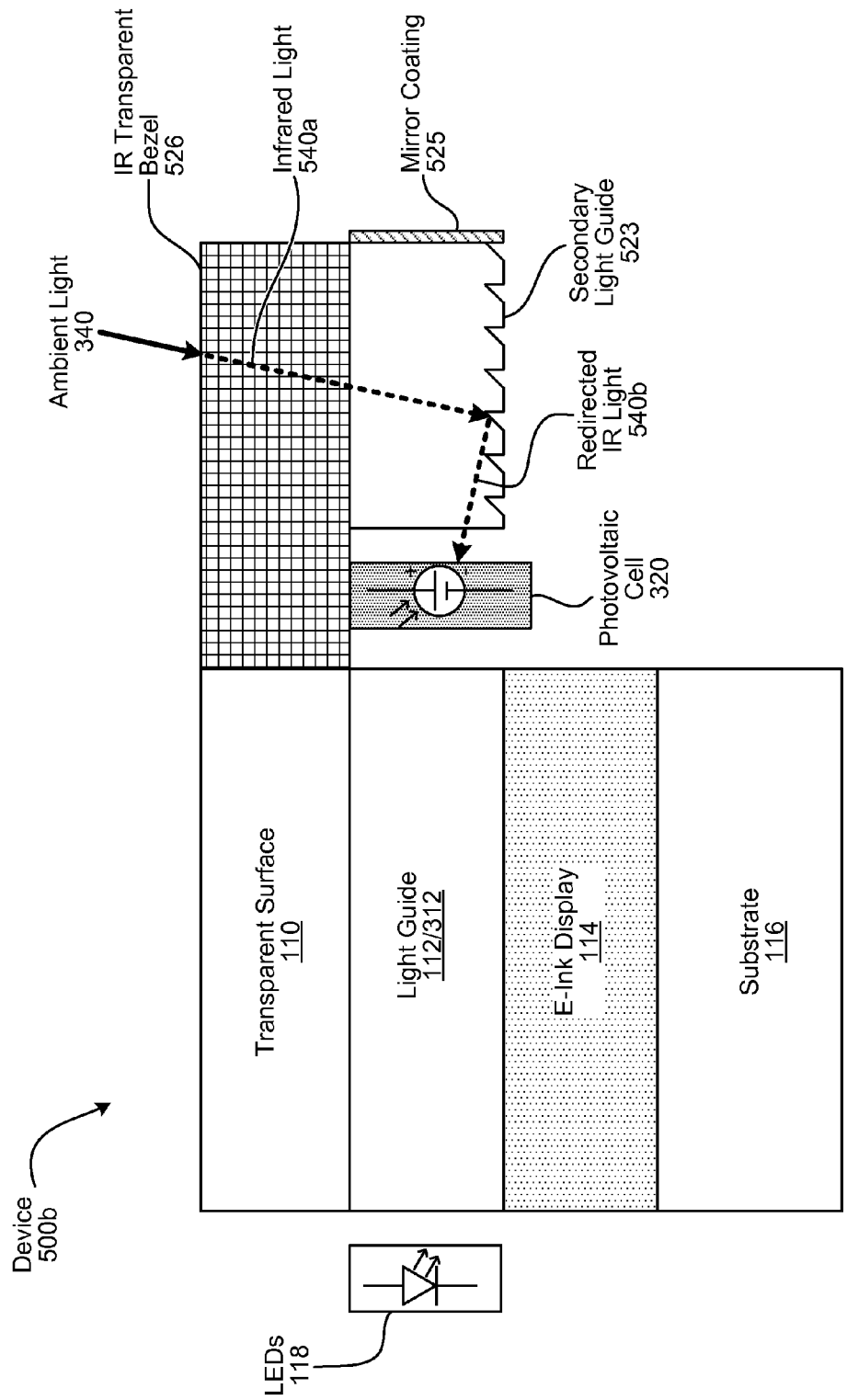
Figure 5C:
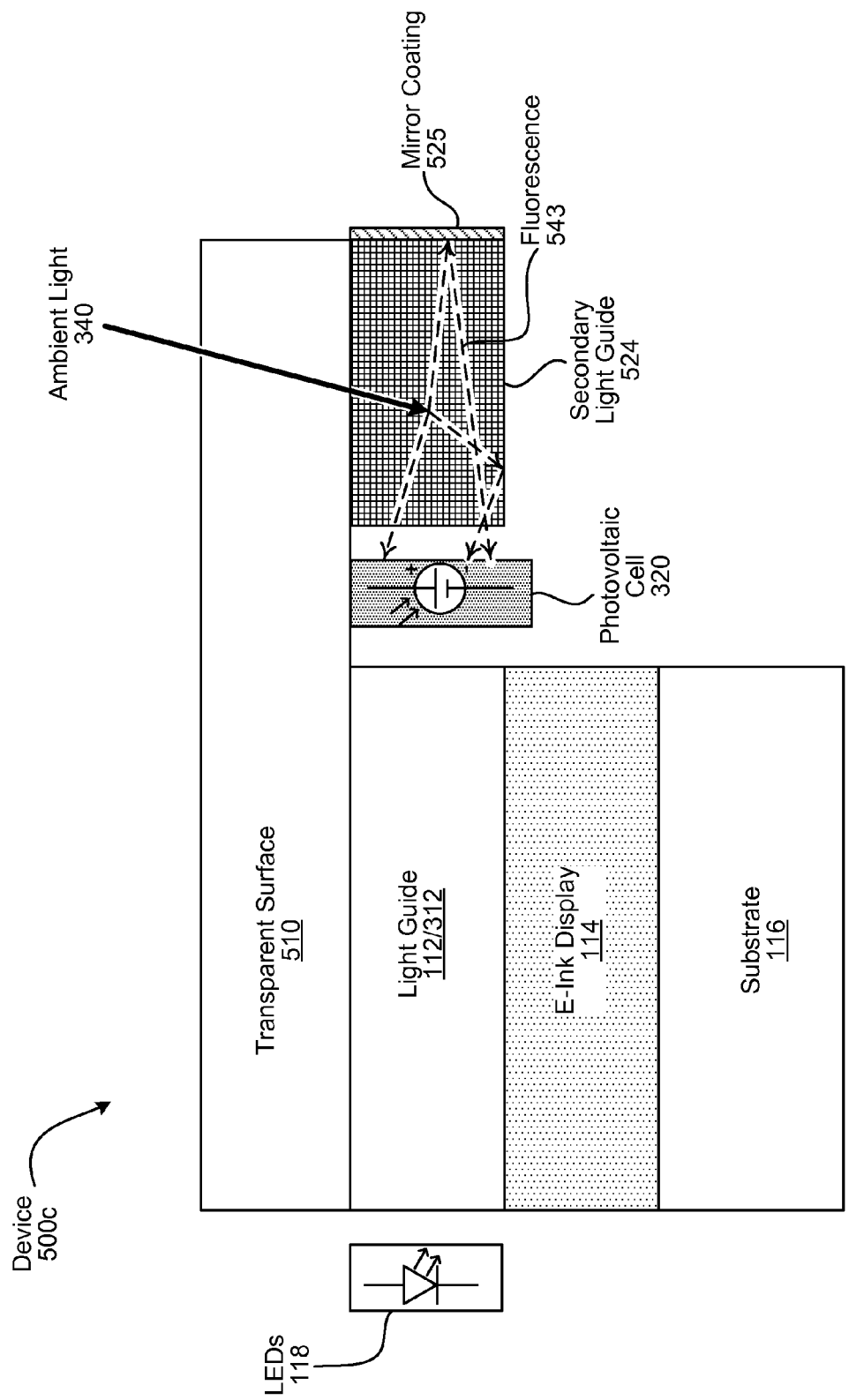

In addition, some reflective electronic display technologies reflect ambient light in such a way as to skew the coloring of the display. For example, the e-ink technology may more favorably reflect (or transmit to the substrate) blue than red (or vice-versa). While the color spectrum of the LEDs 118 may be configured to reduce this colorizing effect, it may nonetheless be noticeable when relying on ambient light 340 for display lighting. In addition to impregnating the light guide 312 with dyes to absorb near-infrared (NIR) wavelengths, photo-luminescent dyes may be included to absorb some of the visible spectrum so as to balance out the color skew of the display, converting the absorbed visible wavelengths into longer NIR/infrared wavelengths to be directed to the photovoltaic cells 320. However, since absorption in the visible spectrum will ordinarily darken the display, this solution to reducing display coloration is best suited for designs where neutral coloration is preferred as an aesthetic over display brightness in ambient lighting conditions, FIGS. 5A to 5C illustrates conceptual features of bezel structures including a secondary light guide for capturing energy from ambient light through the display's bezel. In each example, the bezel appears to be visibly opaque. FIG. 6 illustrates a top-down (overhead) view of a cross-section across the light guide layer in the example devices in FIGS. 5A and 5C including the bezel structure. The structures in FIGS. 5A to 5C and 6 may be combined with the devices described above with FIGS. 1 to 4, or may be used with a device where no light from the light guide is recovered by the peripheral photovoltaic cells.

In FIG. 5A, the housing bezel 526 around a periphery of the display of a device 500 is constructed from a material that is substantially opaque to light in the visible spectrum, but is substantially transparent to light in the infrared and/or near-infrared spectrum. Plastics with these properties are widely used in conjunction with infrared remote controls, where the visibly opaque plastic covers the remote control's infrared LEDs, and may be used at the receiver to cover the infrared photodetector used to receive signals from the remote control. Such plastics often appear to be black with a red tint.

The bezel 526 absorbs all or a substantial portion of the visible spectrum, while transmitting the infrared light component 540 of incident ambient light 340. Beneath the bezel 540 is a secondary light guide 522 impregnated with a fluorescent or phosphorescent dyes that absorbs light in the infrared and/or near-infrared spectrum and reemits the energy at longer wavelengths in the infrared and/or near infrared wavelengths. The dyes may be the same as was used in conduction with the light guide 312 in FIGS. 3 and 4, or may be different. Since transparency to visible wavelengths is not a consideration in the case of the secondary light guide 522, a higher density of dye may be impregnated. However, secondary light guide 522 operates on the same principle as light guide 312, with incident infrared light 540 absorbed by the dye and re-emited isotropically as fluorescence 542 at a longer wavelength to be absorbed by the photovoltaic cell 320.

FIG. 5B illustrates another secondary light guide 523 that may be used with the transparent bezel 526. The secondary light guide 523 does not require photoluminescence, but instead used geometric features to redirect incident infrared light 540a to the photovoltaic cell 320 (as redirected infrared light 540b). An overall sloping bottom edge (not illustrated) or a bottom edge with small embossed features (an example of which is illustrated) may be used. Although the secondary light guide 523 is illustrated as having a rectangular cross-section, the bottom surface may be tapered (e.g., a sloping bottom surface such that the secondary light guide 523 is thicker near the photovoltaic cell 320, tapering to a point at the right hand side of FIG. 5B).

FIG. 5C illustrates another secondary light guide 524. In this example, the transparent surface layer 510 (e.g., cover glass or plastic as describe with layer 110) extends beyond the reflective display to overlap a bezel region. The secondary light guide 524 is dyed with impregnated with photo-luminescent dyes that absorb light in the visible spectrum, re-emitting absorbed energy at longer wavelengths in the infrared and/or near infrared spectrum. From the point-of-view of someone using the device, the bezel region may appear black (or at least, darkly colored).

The photo-luminescent dyes in the secondary light guide 524 may also include dyes to absorb light in the ultraviolet and/or near-infrared spectrums, re-emitting the absorbed energy at longer wavelengths. A dye selected to absorb ultraviolet may re-emit the absorbed energy in the near-infrared spectrum, or may re-emit in the visible spectrum. If the reemitted energy is in the visible spectrum, other photo-luminescent dyes impregnated into the plastic of the secondary light guide 524 may absorb light such re-emitted light in the visible spectrum, re-absorbing it and re-emitting it as infrared or near-infrared energy. That is to say, conversion of ultraviolet light into light to be absorbed by the photovoltaic cells may include more than one wavelength absorption-reemission process. While a portion of any ultraviolet light reemitted in the visible spectrum may provide the bezel with a soft glow at a wavelength or wavelengths of the visible spectrum, the glow may not be noticeable as the ambient light source 340 with the largest ultraviolet component will ordinarily be sunlight (which will wash out such glow).

If the secondary light guide 522/523/524 is used in a device where stray light 132 and/or fluorescence 342 produced from ambient light 340 are also collected from the display's light guide 112/312, a double-sided photovoltaic structure may be used as photovoltaic cell 320. Examples of double-sided photovoltaic cells include cells where the backside conductor of a conventional cell (typically aluminum) is replaced with a transparent conductor (e.g., conductive polymer; indium tin oxide (ITO)), and cells where the back-side conductor is replaced with boron. See, for example, S. Bordihn et al., "Large Area N-Type CZ Double Side Contacted Back-Junction Boron Emitter Solar Cell," in the Proceedings of the 26th European Photovoltaic Solar Energy Conference (2011).

A mirror coating 525 may be included along the outer edges of the secondary light guide 522/523/524. Adding the mirror 525 to the edges of the secondary light guide 522/523/524 is simpler than doing so for the primary light guide 112/312 because the thickness of the plastic of the secondary light guide 522/523/524 is much less constrained, making smoother edges possible. Also, diffraction of reflected light in the secondary light guide 522/523/524 is of no consequence to device performance.

Figure 7B:
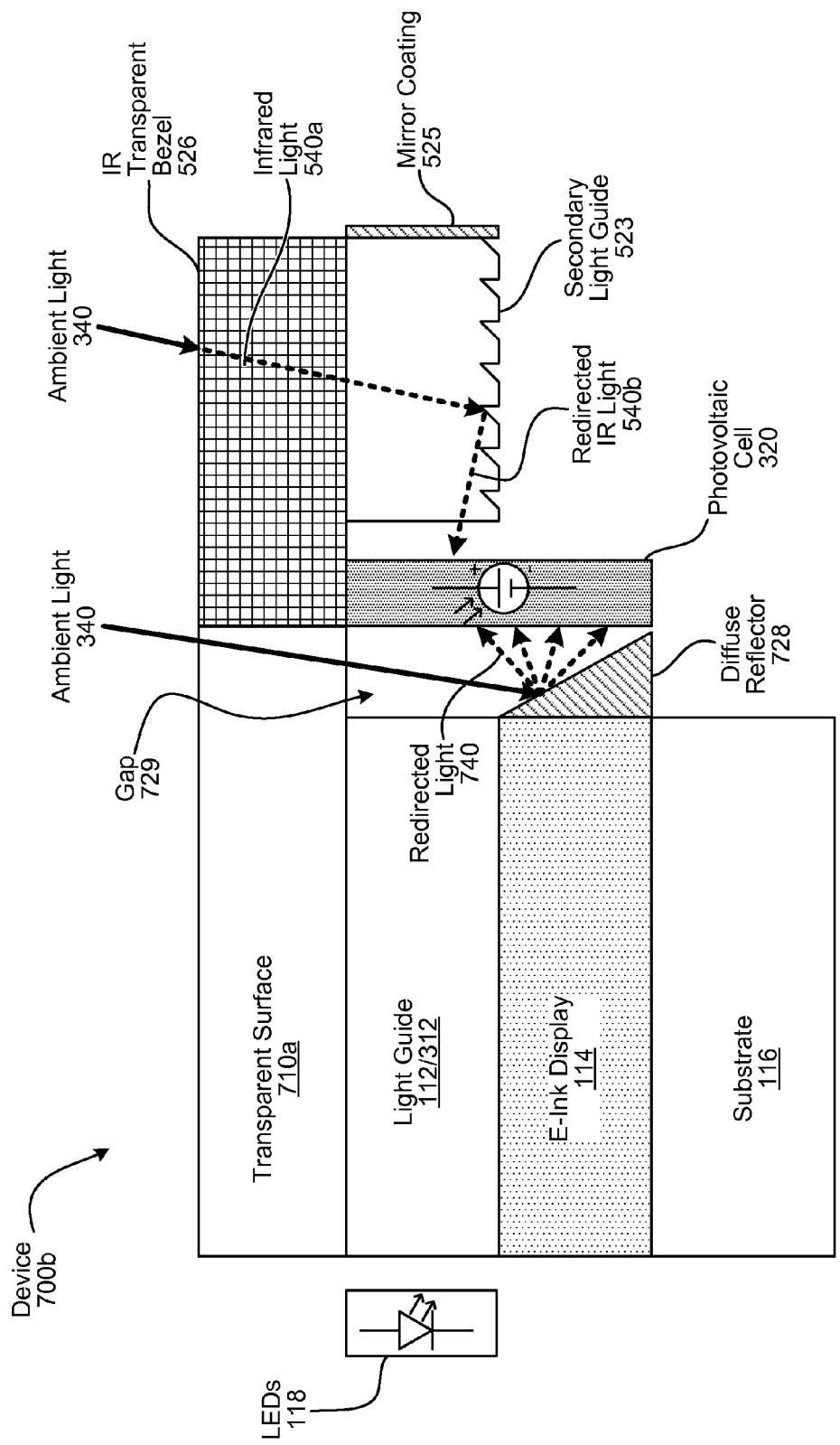

FIG. 6 illustrates a conceptual top-down (overhead) view of a cross-section across the light guide layers in the example devices in FIGS. 5A and 5C, where light reaches the secondary light guide 522/524 through the infrared transparent bezel 526 (FIG. 5A) or transparent surface layer 510 (FIG. 5C) to produce photo-luminescence (e.g., fluorescence 542/543). A conceptual cross-section for the design in FIG. 5B would essentially look the same, except the secondary light guide 523 does not require photoluminescence, FIGS. 7A to 7C illustrate a diffuse reflector that may be added around the periphery of the display in the devices in FIGS. 1 to 6 to capture additional ambient light. FIG. 8 illustrates a top-down (overhead) conceptual view of a cross-section across the light guide layer including the diffuse reflector.

In FIG. 7A, a small diffuse white reflector 728 is added around the periphery of the display of a device 700. As illustrated in FIG. 7A, the diffuse reflector is positioned below the light guide 112/312 so that the reflector does not block light emitted from the edges of the light guide. The reflector's role is to redirect ambient light 340 to an adjacent photovoltaic cell 120, 320. The transparent surface layer 710a (e.g., glass or plastic, as describe with layer 110) is extended over a gap 729 between the light guide and the photovoltaic cell that includes the diffuse reflector 728. This arrangement allows the collection of energy from a wide spectrum (e.g., ultraviolet, visible, and/or infrared wavelengths) without requiring wavelength conversion (i.e., without requiring photo-luminescent dyes). While the area from which light is collected from is small, the efficiency of conversion is higher than is obtained with dye-based wavelength conversion. The gap 729 may be an air gap, or may include an optically clear adhesive (OCA) as previously described.

The gap 729 around the reflective display may be as small as a millimeter or two wide, and from the exterior of the device, may appear as an unchanging white perimeter around the active display. The addition of this gap and the reflector may be combined with any of the structures discussed above in connection with FIGS. 1 to 6.

As illustrated, the arrangement in FIG. 7A includes the IR transparent bezel 526 and secondary light guide 522 from FIG. 5A. FIG. 7B includes the diffuse reflector structure as discussed with FIG. 7A paired with the secondary light guide 523 from FIG. 5B that uses geometric features to redirect infrared light 540a to the photovoltaic cell 320. FIG. 7C includes the diffuse reflector structure as discussed with FIG. 7A paired with the secondary light guide 524 from FIG. 5C, extending the transparent surface layer 710b over the secondary light guide.

Figure 9:
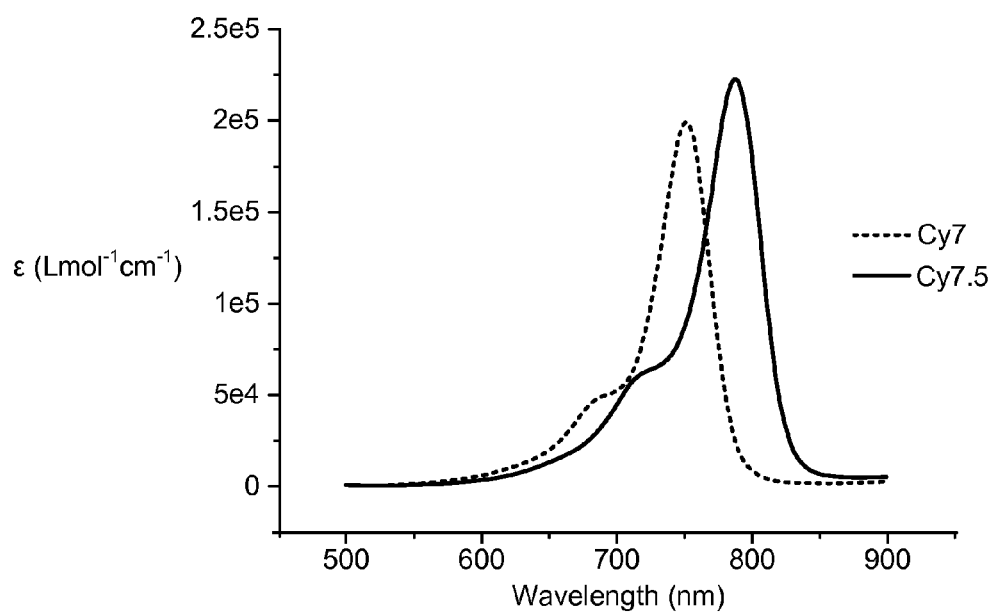
FIG. 9 illustrates absorption curves of example dyes that may be impregnated into that may be impregnated into the plastic of the light guides.
Figure 10:
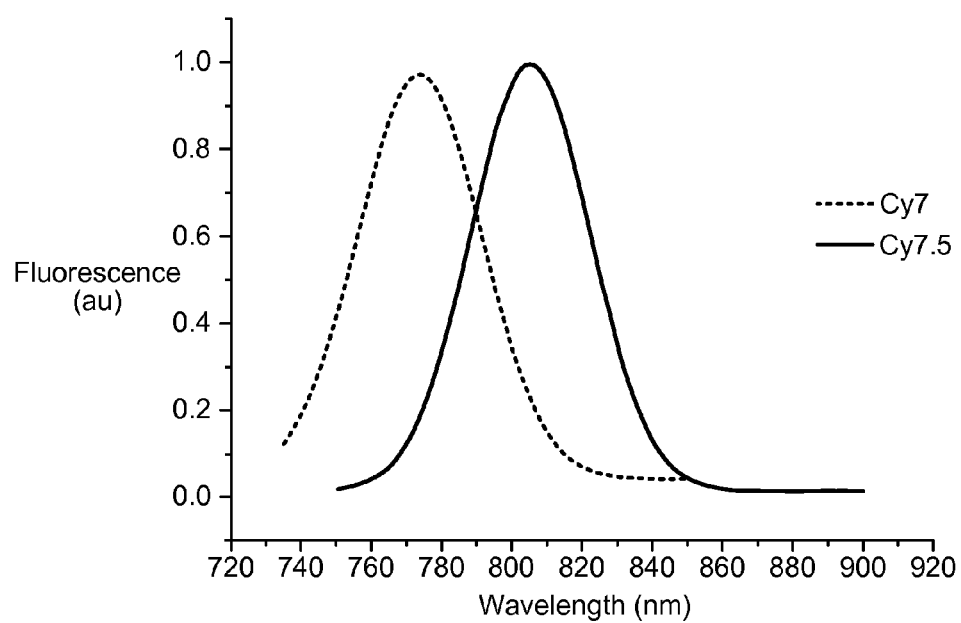
FIG. 10 illustrates fluorescence photo-emission curves for the example dyes in FIG. 9.

FIG. 8 illustrates a conceptual top-down (overhead) view of a cross-section across the light guide layers in the example devices in FIGS. 7A and 7C, where light reaches the secondary light guide 522/524 through the infrared transparent bezel 526 (FIG. 7A) or transparent surface layer 710b (FIG. 7C) to produce photo-luminescence (e.g., fluorescence 542/543). A conceptual cross-section for the design in FIG. 7B would essentially look the same, except the secondary light guide 523 does not require photoluminescence, FIG. 9 illustrates absorption curves of example dyes that may be impregnated into the plastic of the light guides. FIG. 10 illustrates fluorescence photo-emission curves for the example dyes in FIG. 9. The objective of the dye is to efficiently absorb infrared light (and re-emit it) without absorbing significant visible light. One example is a chemical known as Cy7 (a fluorescent dyes with principal absorption maxima at 700 nm), which is an industry standard molecule used originally in fluorescence microscopy for biological samples. A related dye is Cy7.5 (a fluorescent dyes with principal absorption maxima at 750 nm). Cy7.5 is better suited for impregnating into the light guide 312 due to the emission spectrum being deeper into infrared. A commercial source of Cy7 and Cy7.5 is Lumiprobe Life Science Solutions (http://www.lumiprobe.com/) and the curves illustrated in FIGS. 9 and 10 are based upon their products.

An example of a similar dye is Alexa Fluor 750 from Life Technologies Corporation. Alexa Fluor 750 closely matches Cy7's properties, but is reputed to be more stable. Life Technologies Corporation also make a longer wavelength Alexa Fluor 790 (a fluorescent dyes with principal absorption maxima at 790 nm).

Examples of plastics that may be used for light guides are polycarbonate and poly(methyl methacrylate) (PMMA, often referred to as "Acrylic"), although other more complicated chemistries known in the manufacture light guides may also be used. Reflective electronic displays have tended to use PMMA, although polycarbonate is becoming more common, as it is easier to manufacture polycarbonate light guides.

A problem with many plastics, and polycarbonate in particular, is that they tend to absorb blue light. This means that the part of the display far from the illuminating LEDs 118 looks yellowish. The dyes like Cy7 absorb some visible red light (though their main absorption is in the infrared). But this absorption in the visible spectrum may be used to restore some balance back to the color of the display by equalizing with absorption of the blue.

The plastic used to make the light guide 312 may also be impregnated with a "laser" dye with similar absorption and emissions characteristics. Laser dyes are used in chemical lasers. An example of a laser dye suitable for the light guide 312 is LC7300 Pyridine 2 dye from Lambdachrome.

As a substitute for these various organic dyes (referred to as "organic" because each comprises compounds of carbon), quantum dots such as semiconductor nanocrystal quantum dots (NQD) may be used to absorb light having near-infrared wavelengths, and emit the absorbed energy in a longer near-infrared or infrared wavelength. For a background discussion of engineering the absorption and emission spectra of crystalline semiconductor quantum dots based on choice of materials and size effects, see such quantum dots, see A. I. Ekimov et al., "Quantum Size Effect In Semiconductor Microcrystals," Solid State Communications, Vol. 56, No. 11, pp. 921-924 (1985), and a related discussion of colloidal semiconductor nano-crystal quantum dots in L. Brus, "Electronic wave functions in semiconductor clusters:

experiment and theory," Journal of Physical Chemistry, Vol. 90, No. 12, pp. 2555-2560 (1986). Although they operate on different principles, quantum dots act very similar to fluorescent dyes. Like organic dyes, quantum dots absorb light in a range of wavelengths, and emit the absorbed energy at longer wavelengths. Quantum dots tend to absorb light over a broader wavelength range than organic dyes, which in the case of light guide 312, may result in more light being absorbed in the visible spectrum (darkening the display). However, quantum dots tend to emit absorbed energy in a narrower range of wavelengths in comparison to organic dyes, which can simplify pairing them with the absorption band of the photovoltaic cells 320. In addition, the absorption edge may be engineered to a higher or lower wavelength simply by changing the dimensions of the quantum dot, rather than the chemistry of the crystals.

The plastics used in the manufacturer of light guides tend to melt around the boiling point of water, such that most organic photo-luminescent dyes can be impregnated into the melted plastic without appreciable thermal decomposition. Even so, quantum dots with a multitude of absorption and emission characteristics are available from wide variety of manufacturers (e.g., 3M), and tend to be more heat tolerant than fluorescent dyes.

Depending upon the particular organic dye and quantum dot characteristics, it may be advantageous to impregnate the light guide 312 and the secondary light guide 522 differently. For example, to avoid absorbing much of the visible spectrum, an organic dye may be selected for the light guide 312 over the e-ink display 114. In comparison, to broaden range of wavelengths absorbed in the near-infrared band, quantum dots might be used for the secondary light guide 522 in the same device.

Various techniques are known in the art for dissolving dyes into plastics, and some of the techniques still in use today date back to the first half of the Twentieth Century. For background, see U.S. Pat. No. 2,524,811 entitled "Dyeing Plastic Articles With An Aqueous Dispersion Of Dye Dissolved In A Plasticizer" by Koberlein (1950), and U.S. Pat. No. 4,139,342 entitled "Dye Impregnating Plastics for Laser Applications" by Sheldrake et al. (1979). See also G. Oster et al., "Luminescence in Plastics," Nature, Vol. 196, pp. 1089-1090 (1962) (discussing, among other things, dissolving organic luminescent dyes into polycarbonate), and U.S. Pat. No. 4,139,342 entitled "Dye Impregnated Plastics For Laser Applications" by Sheldrake et al. (1979) (discussing impregnating plastics with laser dyes). As discussed in the Sheldrake Patent, the doping profiles of the dyes impregnated into plastics may be controlled. However, while complex doping profiles could be used, the light guides 312, 522, and 524 may be made using standard uniform doping as is common in the industrial practice of dyeing plastics.

FIGS. 11 to 15 relate to selecting semiconductor materials for photovoltaic cells 120 and 320.

Figure 11:
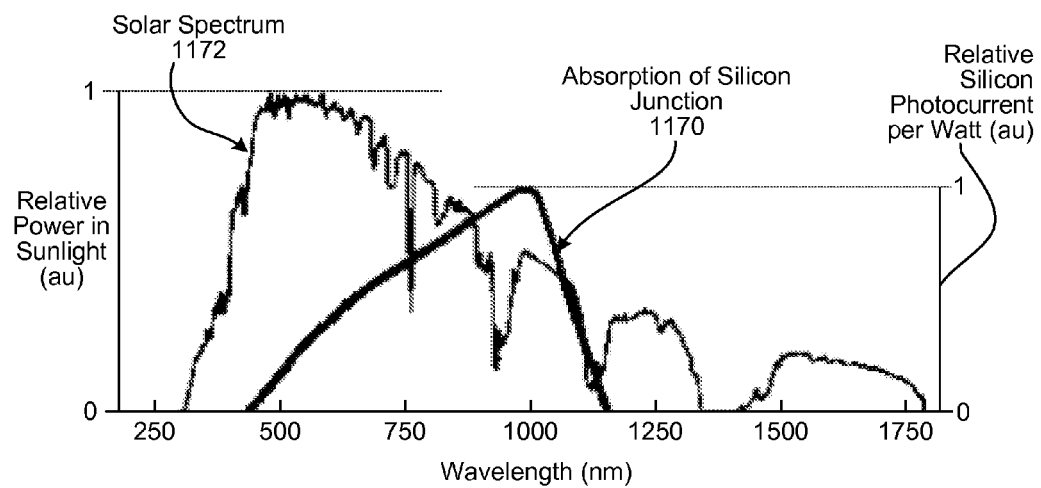
FIG. 11 illustrates the wavelength distribution of the solar spectrum relative to the absorption curve for a silicon junction photovoltaic.

FIG. 11 illustrates the absorption curve 1170 for a conventional silicon junction photovoltaic relative to the wavelength distribution of the solar spectrum 1172. The vertical axis on the right side of FIG. 11 illustrates the relative silicon photocurrent per Watt (au) of the absorption of the silicon junction 1170. The vertical axis on the left side of FIG. 11 illustrates the relative power in sunlight (au) of the solar spectrum 1172. The solar spectrum 1172 (AM 1.5 solar spectrum) includes light having ultraviolet, visible, and infrared wavelengths, with a peak corresponding to the color green (495-570 nm). In comparison, peak absorption for a silicon junction is in the near-infrared region.

The peak absorption wavelength of crystalline and polycrystalline semiconductor material is inversely proportional to the semiconductor's bandgap, which is the difference in energy between an electron in the crystal at rest and the energy of the electron after excitation due to absorbing incident light. The energy gap of bulk silicon is 1.12 electron volts (eV) at 300 degrees Kelvin.

Figure 12:
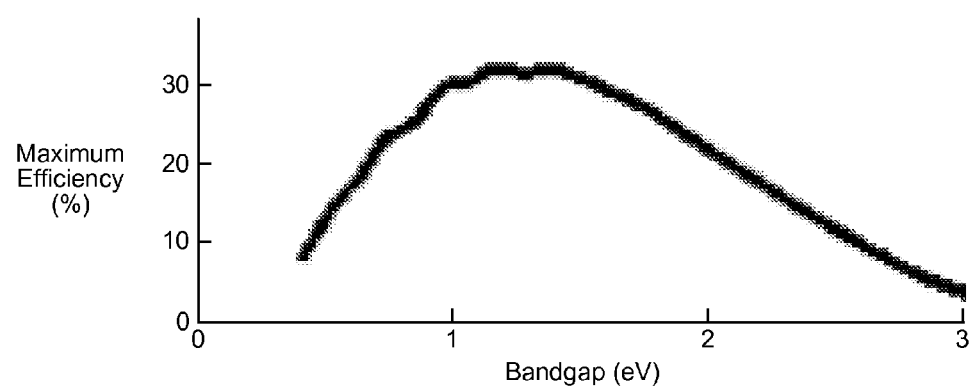
FIG. 12 illustrates the maximum theoretical efficiency for converting the solar spectrum into photovoltaic power relative to the semiconductor bandgap, where semiconductor bandgap is a property of the photovoltaic cell.

FIG. 12 illustrates the Shockley-Queisser limit, corresponding to the maximum efficiency of a solar cell for absorbing the solar spectrum 1172 relative to the cell's semiconductor bandgap. For the solar spectrum, the ideal bandgap value is between 1 and 1.5 eV. The Shockley-Queisser limit places maximum solar conversion efficiency around 33.7% assuming a single p-n junction photovoltaic cell with a band gap of 1.34 eV (using an AM 1.5 solar spectrum).

Figure 13:
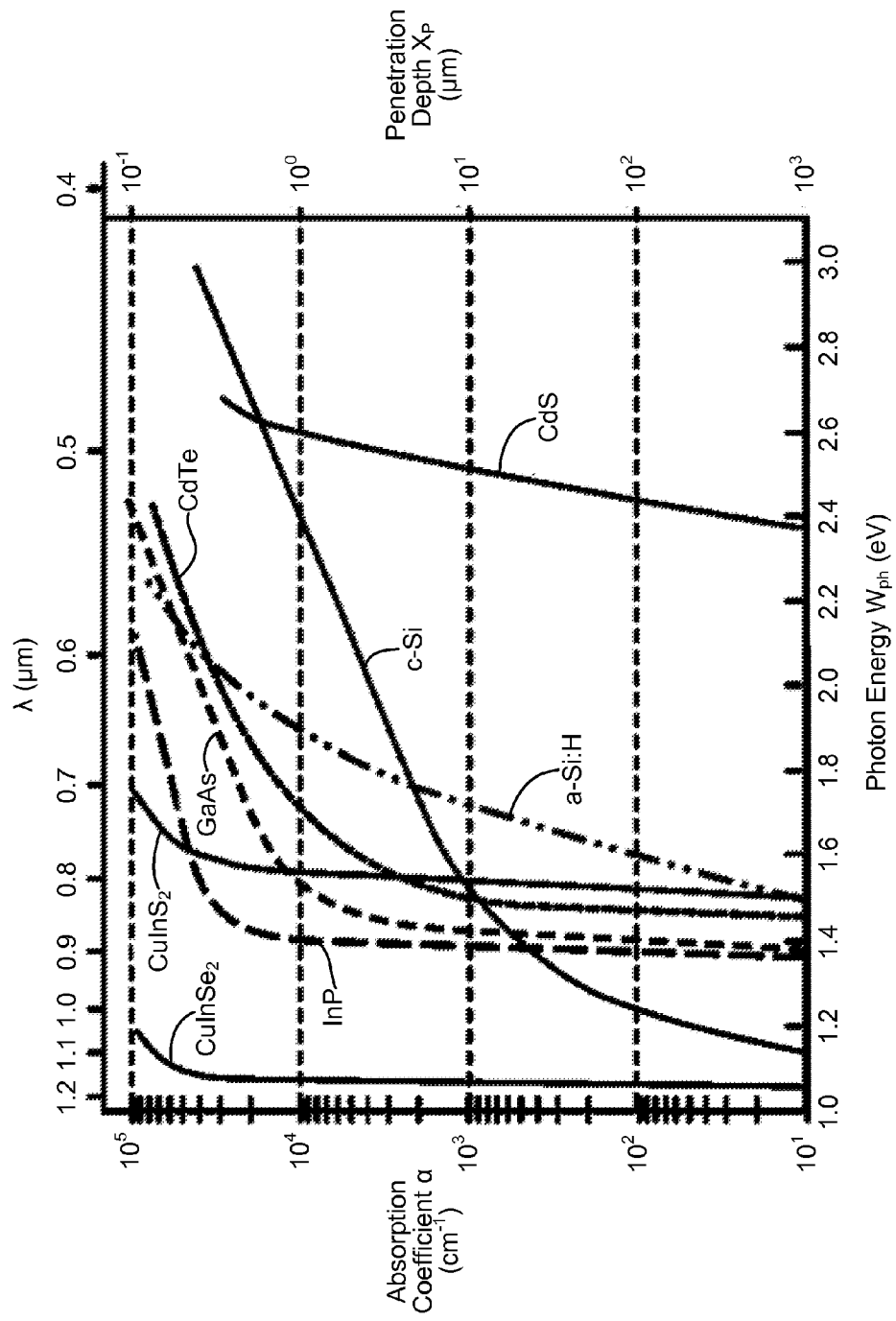
FIG. 13 illustrates the relationship between wavelength and absorption for various example semiconductors materials.

Many different semiconductor technologies are available to optimize the photovoltaic cells for different spectra. FIG. 13 illustrates the absorption coefficients relative to the wavelength of the absorbed light. The absorbed wavelength and the energy of the absorbed light have a reciprocal relationship. The absorption coefficient and the depth of penetration of a wavelength of light also has a reciprocal relationship. Relatively high energy wavelengths (e.g., visible wavelengths) may be absorbed near a surface of the photovoltaic (i.e., shallow penetration depth), whereas lower energy wavelengths (e.g., near-infrared) may require penetration into the body of the photovoltaic before absorption (based upon an average distribution).

Figure 14:
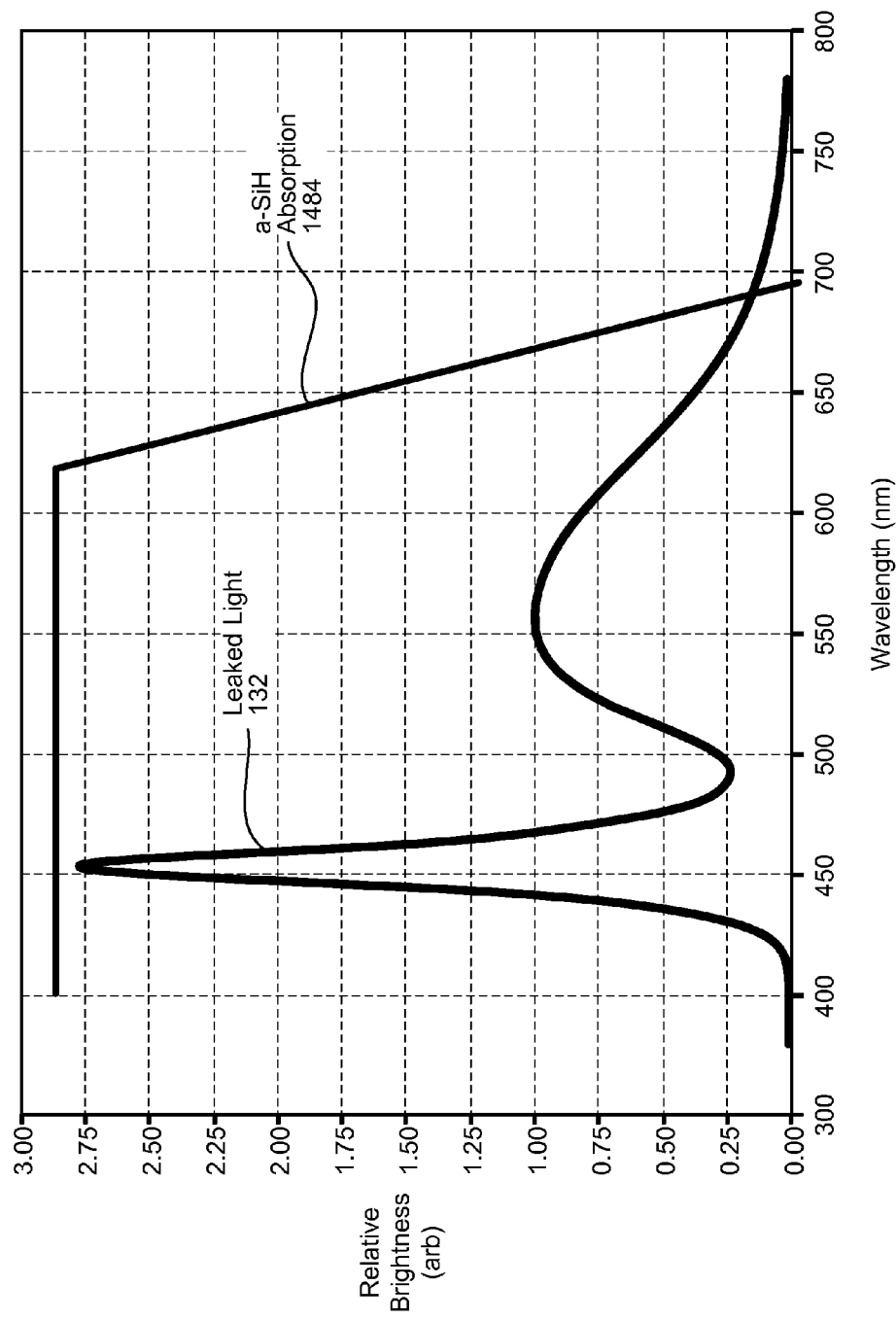
FIG. 14 illustrates a typical color spectrum produced by edge-lit front-light displays, and an approximate wavelength absorption sensitivity of an example photovoltaic sensitive to the visible light spectrum.

Amorphous silicon (a-Si:H in FIG. 13) is a good match for photovoltaic cells 120 to absorb the spectrum of typical front-light LEDs 118. As illustrated in FIG. 14, a simplified schematic absorption spectrum of a-Si:H will absorb most of the wavelengths included in the leaked light 132, exhibiting that a-Si:H is relatively well suited for absorbing wavelengths in the relatively short visible spectrum band. The emission curve for the leaked like 132 of the LEDs 112 is an example of what a realistic spectrum may look like. Referring to devices including the diffuse reflector 728, a-Si:H is also a relatively good choice for absorbing visible wavelengths of the solar spectrum 1172.

Unlike sunlight, the LED light is almost exclusively visible light where each photo has a relatively large energy (short wavelength). From a design point-of-view, it is best to have the absorption edge at the longer end of the wavelength distribution, but as close as possible to the principle wavelengths (bulk) of the emitted light. Therefore, energy is efficiently collected if the photovoltaic cells tunes to absorb the shorter wavelengths of the spectrum to be absorbed, such that amorphous silicon (a-Si:H) is an efficient choice. From a manufacturing point of view, another advantage of amorphous silicon is the availability of flexible cells on transparent plastic substrates.

Figure 15:
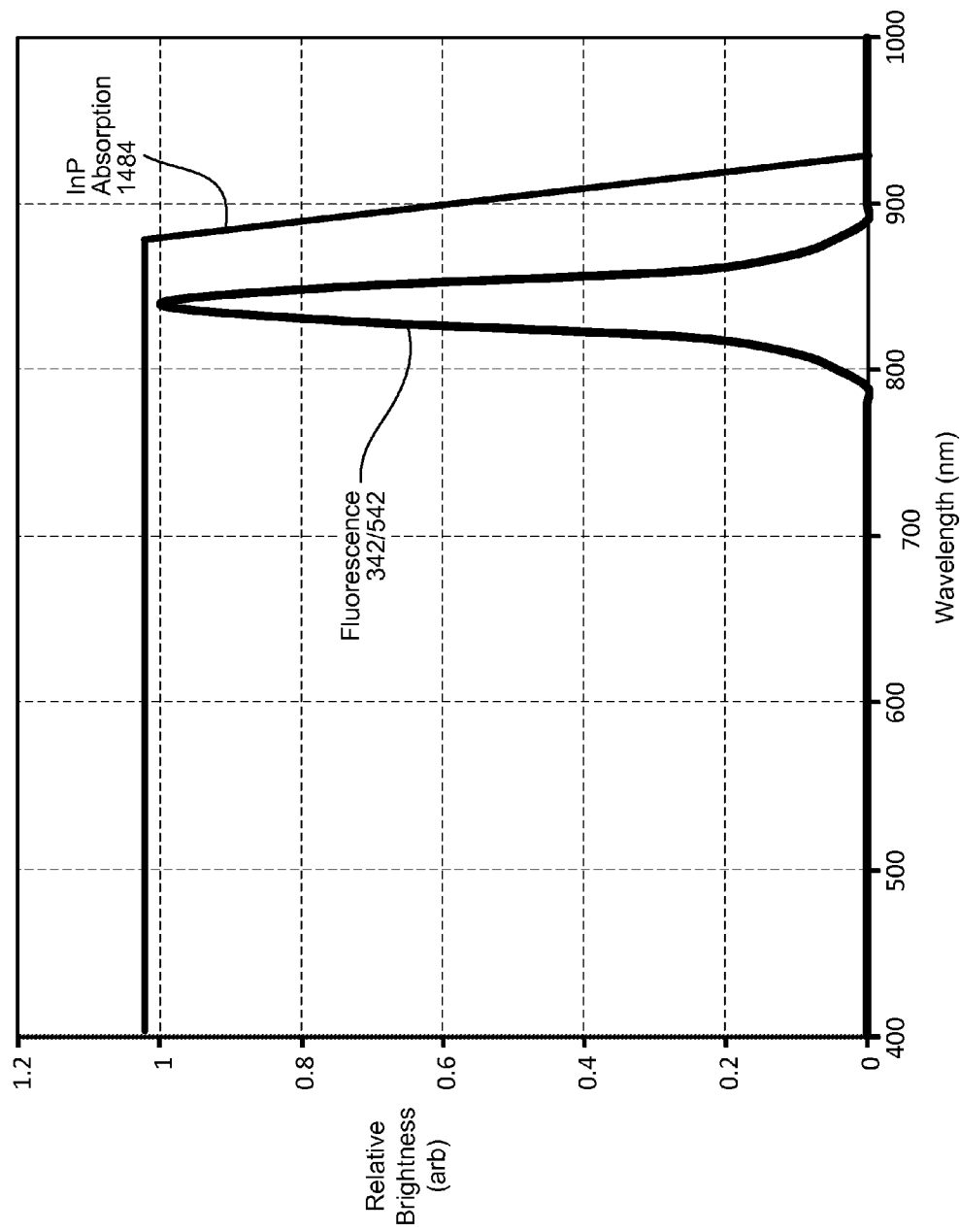
FIG. 15 illustrates an example of a color spectrum that might hypothetically be produced by a luminescent material impregnated into a light guide, and an approximate wavelength absorption sensitivity of an example photovoltaic sensitive to both the visible and near-infrared light spectrums.

In comparison, FIG. 15 illustrates a simulated fluorescence emission spectrum for the fluorescence 342 and 542 emitted by the light guide 312 and/or the secondary light guide 522, with the impregnated organic dye or quantum dots converting near-infrared light (e.g., at a peak wavelength of 750 nm) into a longer near-infrared wavelength (e.g., 800-1000 nm). An efficient semiconductor material for the collection of this fluorescence spectrum by the photovoltaic cells 320 is indium phosphide (InP). The illustrated absorption curve 1484 is a simplified schematic, included to show indium phosphide's suitability for absorbing longer near-infrared wavelengths (longer relative to FIG. 14).

If capturing light from both visible and near-infrared portions of the spectrum, material selection becomes an exercise in balancing optimal power collection between the different spectra. One design consideration is expected user behavior, such as whether users are expected to use the device more outdoors (favoring optimizing conversion for the impregnated dye) versus reading at night (favoring optimizing conversion for leaked light from the LEDs).

Common and readily available photovoltaic cells include amorphous silicon, crystalline silicon (c-Si in FIG. 13), and cadmium telluride (CdTe in FIG. 13) cells. Of these, crystalline silicon has the broadest absorption curve, spanning near-infrared and visible wavelengths. Another photovoltaic cell material that may be advantageous is CIGS (Copper indium gallium (di)selenide), which can be tuned to provide a bandgap from 1.0 to 1.7 eV depending upon the ratio of indium to gallium.

Figure 16:
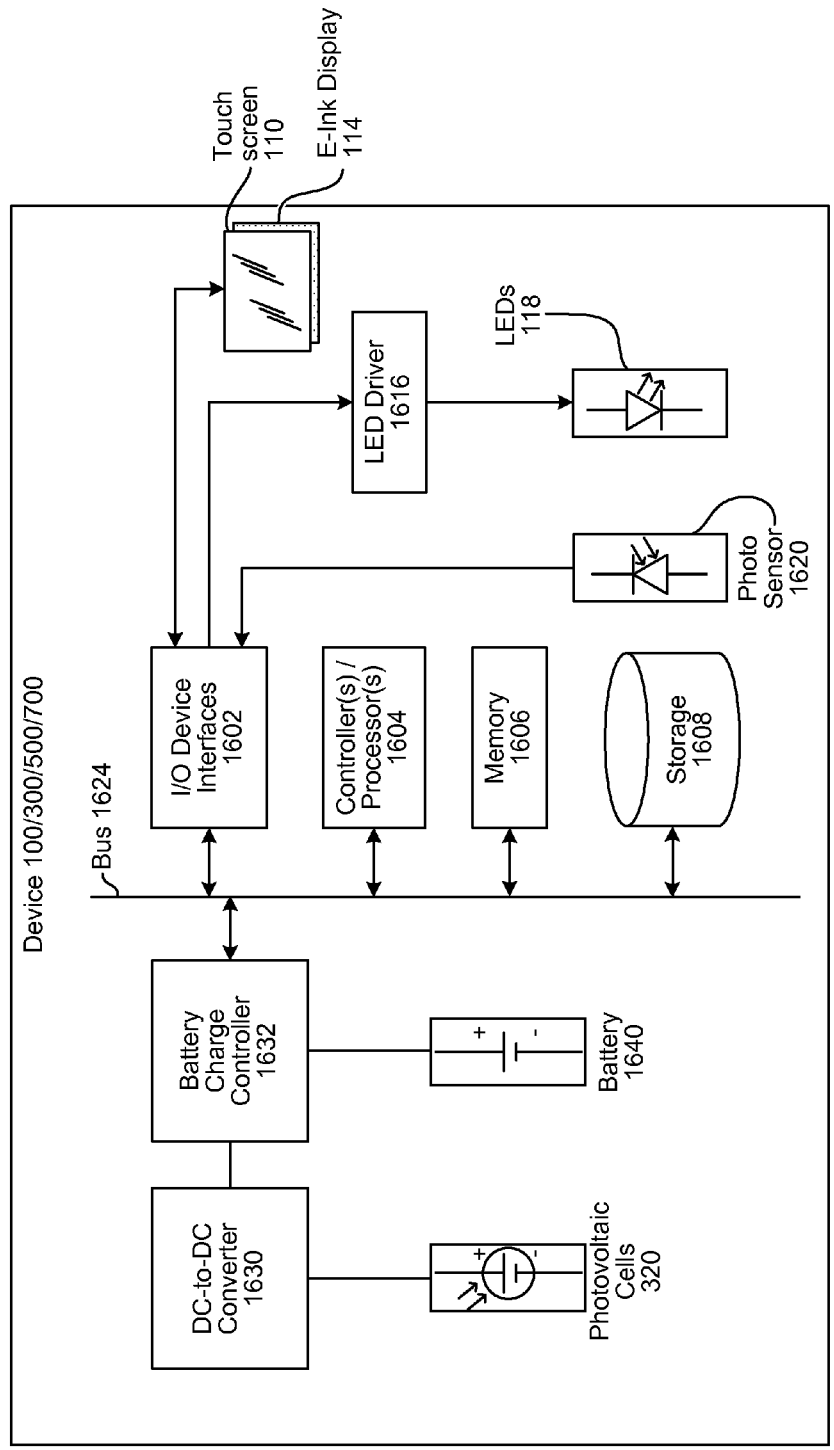
FIG. 16 is a block diagram conceptually illustrating example components of a device incorporating at least one of the photovoltaics.

FIG. 16 is a block diagram conceptually illustrating example active (i.e., powered) components of the device 100, 300, 500, and 700 (collectively referred to as "the device"). In operation, the device may include computer-readable and computer-executable instructions that reside on the device, as will be discussed further below.

The device may include the touch screen 110 and the electronic display layer 114. The touch screen is a capacitive touch screen, although resistive or optical touch interfaces may be used instead. The electronic display layer 114 may be, among other things, e-ink (electrophoretic ink) an electrophoretic display, an electrowetting display, a electrofluidic display, an interferometric modulator display, or any other electronic paper or similar technology that may be used in a reflective electronic display.

The LEDs 118 are driven by an LED driver 1616. The LED driver 1616 may adjust the brightness of the LEDs using a modulation technique such as pulse-width modulation (PWM), as known in the art. The LED driver may receive a signal or information indicating the ambient light 340 incident on the device, and adjust the intensity of the light emitted by the LEDs based on this signal/information. The LED driver 1616 may receive this signal/information directly from a photo sensor 1620, or indirectly via an input/output device interface 1602.

The device includes input/output device interfaces 1602. A variety of components may be connected through the input/output device interfaces 1602, such as the display (touch screen 110, e-ink display 114), the LED driver 1616, the photo sensor 1620, a speaker, a microphone, etc. The input/output device interfaces 1602 may also include an interface for an external peripheral device connection such as universal serial bus (USB), FireWire, Thunderbolt or other connection protocol, and may also include a connection to one or more networks via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device may include an address/data bus 1624 for conveying data among components of the device. Each component within the device may also be directly connected to other components in addition to (or instead of) being connected to other components across the bus 1624.

The device may include one or more controllers/processors 1604, that may each include a central processing unit (CPU) for processing data and computer-readable instructions, and a memory 1606 for storing data and instructions. The memory 1606 may include volatile random access memory (RAM), non-volatile read only memory (ROM), non-volatile magnetoresistive (MRAM) and/or other types of memory. The device may also include a data storage component 1608, for storing data and controller/processor-executable instructions (e.g., instructions for displaying media on the e-ink display, instructions for setting LED intensity, etc.). The data storage component 1608 may include one or more non-volatile storage types such as magnetic storage, optical storage, solid-state storage, etc. The device may also be connected to removable or external non-volatile memory and/or storage (such as a removable memory card, memory key drive, networked storage, etc.) through the input/output device interfaces 1602.

Computer instructions for operating the device 110 and its various components may be executed by the controller(s)/processor(s) 1604, using the memory 1606 as temporary "working" storage at runtime. The computer instructions may be stored in a non-transitory manner in non-volatile memory 1606, storage 1608, or an external device. Alternatively, some or all of the executable instructions may be embedded in hardware or firmware in addition to or instead of software.

The device further includes the photovoltaic cells 120/320 and a battery 1640 that power the device. The photovoltaic cells 120/320 are electrically connected in parallel. The photovoltaic cells 120/320 typically will output a voltage between 0.5 and 0.8 volts, which is less than that of a standard battery (e.g., battery 1640). A DC-to-DC converter 1630 increases this voltage to the voltage of the battery 1640. A battery charge controller 1632 manages the flow of current into and out of the battery 1640, and provides information about battery and charging to the operating system and/or software applications executed by the controller(s)/processor(s) 1604. In the alternative, the photovoltaic cells 120/320 can be connected in series in order to boost voltage (reducing current), but the DC-to-DC converter 1630 may still be included to adjust the resulting voltage. The DC-to-DC converter 1630 and battery charge controller 1632 may be an integrated device.

The concepts disclosed herein may be applied within a number of different devices and computer systems, including, for example, cellular phones, tablet computers, and marketing displays that utilize front-lit displays.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of electronic paper readers, luminescent solar concentrators, and photovoltaics should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

As used in this disclosure, the term "a" or "one" may include one or more items unless specifically stated otherwise. Further, the phrase "based on" is intended to mean "based at least in part on" unless specifically stated otherwise.

What is claimed is:
1. A computing device, comprising:
a front-lit reflective electronic display screen, comprising in order from an exterior surface of the device:
a clear cover layer comprising plastic or glass, a first light guide composed of plastic including a first photoluminescent material, the first light guide being substantially transparent to visible wavelengths of light, the first photoluminescent material absorbing light incident on the display through the clear cover layer in a first near-infrared wavelength and emitting absorbed energy as light in a longer second near-infrared wavelength, and a reflective electronic display;

a plurality of light emitting diodes (LEDs) proximate to a first edge of the first light guide, the plurality of LEDs arranged to inject light having visible wavelengths into the first light guide to illuminate the reflective electronic display;

a photovoltaic cell arranged along a second edge of the first light guide, wherein a light absorbing surface of the photovoltaic cell is oriented perpendicular to an exposed face of the display screen, the photovoltaic cell configured to:

receive at least some of the visible wavelengths of the light emitted from the LEDs, via the first light guide, and convert energy of the at least some of the visible wavelengths of the light into electrical power, and receive the second near-infrared wavelength and covert energy associated with the second near-infrared wavelength into electrical power;

a battery that powers the computing device; and a battery charge controller configured to charge the battery using the electrical power from the photovoltaic cell.

2. The computing device of claim 1, wherein the first photoluminescent material comprises an organic dye or quantum dots.

3. The computing device of claim 1, further comprising:

a bezel around the display composed of a plastic that is substantially opaque to visible wavelengths of light and substantially transparent to a third near-infrared wavelength; and a second light guide composed of plastic including a second photoluminescent material, the second light guide arranged around the display proximate to the second edge, the photovoltaic cell being arranged between the first and second light guides, the second photoluminescent material absorbing light having the third near-infrared wavelength that passes through the bezel and emitting absorbed energy as light in a longer fourth near-infrared wavelength, wherein the photovoltaic cell is double-sided and is further configured to:

receive the fourth near-infrared wavelength and convert energy associated with the fourth near-infrared wavelength into electrical power.

4. The computing device of claim 1, wherein a portion of the clear cover layer extends beyond the second edge of the first light guide, the computing device further comprising:

a reflector with a light diffusing surface arranged between the photovoltaic cell and the reflective electronic display, the reflector configured to reflect incident light received through the portion of the clear cover layer toward the photovoltaic cell.

5. A device comprising:

a display screen comprising in order from an exterior surface of the device:

a clear cover layer, a first light guide substantially transparent to visible wavelengths of light, and a reflective electronic display;

a light source proximate to a first edge of the first light guide, the light source arranged to inject light having visible wavelengths into the first light guide to illuminate the reflective electronic display; and a photovoltaic cell arranged along a second edge the first light guide, wherein a light absorbing surface of the photovoltaic cell is oriented perpendicular to a face of the display screen, the photovoltaic cell configured to receive at least some of the visible wavelengths of the light emitted from the light source via the first light guide and convert energy of the at least some of the visible wavelengths of light into electrical power.

6. The device of claim 5, the first light guide further comprising a first photoluminescent material, the first photoluminescent material absorbs light in a first near-infrared wavelength and outputs light in a longer second near-infrared wavelength, wherein the photovoltaic cell is further configured to:

receive the second near-infrared wavelength and convert energy associated with the second near-infrared wavelength into electrical power.

7. The device of claim 6, wherein the first photoluminescent material comprises an organic dye or quantum dots.

8. The device of claim 5, further comprising:

a bezel that is substantially opaque to visible wavelengths of light and substantially transparent to a first near-infrared wavelength; and a second light guide including a photoluminescent material, the photovoltaic cell being arranged between the first light guide and the second light guide, wherein:

the photoluminescent material absorbs light having the first near-infrared wavelength via the bezel and outputs absorbed light in a longer second near-infrared wavelength, and the photovoltaic cell is double-sided and further configured to:

receive the second near-infrared wavelength and convert energy associated with the second near-infrared wavelength into electrical power.

9. The device of claim 5, further comprising:

a bezel that is substantially opaque to visible wavelengths of light and substantially transparent to a first near-infrared wavelength; and a second light guide including geometric features to receive light having the first near-infrared wavelength via the bezel and reflect the received light toward the photovoltaic cell, wherein the photovoltaic cell is double-sided and further configured to receive the first near-infrared wavelength and convert energy associated with the first near-infrared wavelength into electrical power.

10. The device of claim 5, wherein a portion of the clear cover layer extends beyond the second edge of the first light guide, the device further comprising:

a second light guide including a photoluminescent material, the photovoltaic cell being arranged between the first light guide and the second light guide, wherein:

the photoluminescent material absorbs incident light having visible wavelengths received via the portion of the clear cover layer and outputs absorbed light in a longer near-infrared wavelength, and the photovoltaic cell is double-sided and further configured to receive the near-infrared wavelength and convert energy associated with the near-infrared wavelength into electrical power.

11. The device of claim 5, wherein a portion of the clear cover layer extends beyond the second edge of the first light guide, the device further comprising:
 a reflector with a light diffusing surface arranged between the reflective electronic display and the photovoltaic cell, the reflector configured to reflect incident light received via the portion of the clear cover layer toward the photovoltaic cell.

12. The device of claim 5, wherein the first light guide further comprises a first photoluminescent material, the first photoluminescent material absorbs light in a first near-infrared wavelength and outputs light in a longer second near-infrared wavelength, and the device further comprises:
 a bezel that is substantially opaque to visible wavelengths of light and substantially transparent to a third near-infrared wavelength; and
 a second light guide including a second photoluminescent material, the photovoltaic cell being arranged between the first light guide and the second light guide,
 wherein:
  the second photoluminescent material absorbs light having the third near-infrared wavelength that passes through the bezel and outputs light in a longer fourth near-infrared wavelength,
  the photovoltaic cell is double-sided,
  the photovoltaic cell is further configured to receive the second near-infrared wavelength and convert energy associated with the second near-infrared wavelength into electrical power,
  the photovoltaic cell is further configured to receive the fourth near-infrared wavelength and convert energy associated with the fourth near-infrared wavelength into electrical power, and
  the first photoluminescent material and the second photoluminescent material have different light absorption spectra.

13. A method of operating an electronic device comprising:
 front-lighting a reflective electronic display by injecting light from a light source into a first light guide, the first light guide being substantially transparent to visible wavelengths of light;
 capturing injected light leaking from an edge of the first light guide using a photovoltaic cell arranged along the edge, wherein a light absorbing surface of the photovoltaic cell is oriented perpendicular to a face of the reflective electronic display;
 converting energy of the injected light into electrical power; and
 charging a battery using the electrical power.

14. The method of claim 13, further comprising:
 absorbing light incident on a face of the first light guide that has a first near-infrared wavelength using a first photoluminescent material included in the first light guide;
 outputting light in a second near-infrared wavelength from the first photoluminescent material, the second near-infrared wavelength being longer than the first near-infrared wavelength, and the first photoluminescent material outputting the second near-infrared wavelength isotropically;
 capturing the light having the second near-infrared wavelength using the photovoltaic cell; and
 converting energy of the captured light having the second near-infrared wavelength into electrical power.

15. The method of claim 14, wherein the first photoluminescent material comprises an organic dye or quantum dots.

16. The method of claim 13, further comprising:
 receiving light having a first near-infrared wavelength via a bezel that is proximate to the reflective electronic display, the bezel being substantially opaque to light having visible wavelengths;
 absorbing the first near-infrared wavelength using a first photoluminescent material included in a second light guide arranged beneath the bezel;
 outputting light in a second near-infrared wavelength from the first photoluminscent material, the second near-infrared wavelength being longer than the first near infrared wavelength, the first photoluminescent material outputting the second near-infrared wavelength isotropically;
 capturing the output light having the second near-infrared wavelength using the photovoltaic cell; and
 converting energy of the captured light having the second near-infrared wavelength into electrical power.

17. The method of claim 13, further comprising:
 receiving light having a first near-infrared wavelength via a bezel that is proximate to the reflective electronic display, the bezel being substantially opaque to light having visible wavelengths;
 reflecting the light having the first near-infrared wavelength toward the photovoltaic cell; and
 converting energy of the reflected light having the first near-infrared wavelength into electrical power.

18. The method of claim 13, further comprising:
 receiving incident light via a portion of a clear cover layer of the reflective electronic display that extends beyond the reflective electronic display;
 absorbing visible wavelengths of the received incident light using a first photoluminescent material included in a second light guide arranged beneath the portion of the clear cover layer;
 outputting light in a near-infrared wavelength from the first photoluminscent material, the first photoluminescent material outputting the near-infrared wavelength isotropically;
 capturing the output light having the near-infrared wavelength using the photovoltaic cell; and
 converting energy of the captured light having the near-infrared wavelength into electrical power.

19. The method of claim 13, further comprising:
 receiving incident light via a portion of a clear cover layer of the reflective electronic display that extends beyond the reflective electronic display;
 reflecting the received incident light into the photovoltaic cell.

20. The method of claim 13, further comprising:
 absorbing light incident on a face of the first light guide that has a first near-infrared wavelength using a first photoluminescent material included in the first light guide;
 outputting first light in a second near-infrared wavelength from the first photoluminescent material, the second near-infrared wavelength being longer than the first near-infrared wavelength, the first photoluminescent material outputting the second near-infrared wavelength isotropically;
 capturing the first light using a first side of the photovoltaic cell;
 absorbing light incident on a bezel that is proximate to the reflective electronic display using a second photoluminescent material included in a second light guide, the photovoltaic cell arranged between the first and second light guides;

outputting second light in a third near-infrared wavelength from the second photoluminscent material, the second photoluminescent material outputting the third near-infrared wavelength isotropically;
capturing the second light using a second side of the photovoltaic cell; and
converting energy of the captured first and second light into electrical power,
wherein the first photoluminescent material and the second photoluminescent material have different light absorption spectra.

* * * * *